(12) United States Patent
Xiong

(10) Patent No.: US 11,856,650 B2
(45) Date of Patent: Dec. 26, 2023

(54) METHOD FOR IMPLEMENTING COMMUNICATION CONTINUITY AND RELATED DEVICE

(71) Applicant: Tencent Technology (Shenzhen) Company Limited, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/987,792

(22) Filed: Nov. 15, 2022

(65) Prior Publication Data

US 2023/0074358 A1 Mar. 9, 2023

Related U.S. Application Data

(63) Continuation of application No. PCT/CN2022/073418, filed on Jan. 24, 2022.

(30) Foreign Application Priority Data

Feb. 10, 2021 (CN) .......................... 202110184916.7

(51) Int. Cl.
*H04W 8/26* (2009.01)
*H04W 76/10* (2018.01)
*H04L 61/256* (2022.01)

(52) U.S. Cl.
CPC ........... *H04W 8/26* (2013.01); *H04L 61/2564* (2013.01); *H04W 76/10* (2018.02)

(58) Field of Classification Search
CPC ...... H04W 8/26; H04W 76/10; H04L 61/2564
See application file for complete search history.

(56) References Cited

U.S. PATENT DOCUMENTS 9,369,394 B2 * 6/2016 Ludwig ............... H04L 47/2441
11,418,600 B1 * 8/2022 Panem Jaya ......... H04L 67/141
(Continued)

FOREIGN PATENT DOCUMENTS

| CN | 111586670 A | 8/2020 |
| CN | 113014630 A | 6/2021 |
| WO | WO 2021009166 A1 | 1/2021 |

OTHER PUBLICATIONS

3GPP TS 23.501 Version 15.2.0 Release 15; 5G; System Architecture for the 5G system; Jun. 2018 (Year: 2018).*
(Continued)

*Primary Examiner* — Dhairya A Patel
(74) *Attorney, Agent, or Firm* — Morgan, Lewis & Bockius LLP

(57) ABSTRACT

The present disclosure provides a method for implementing communication continuity at a computer device acting as an application function (AF) device corresponding to user equipment (UE), the UE establishing a wireless connection to a source application server (AS) using allocated UE source network address information. The method includes: determining a data service migration from the source AS to a target AS; transmitting a network address translation (NAT) parameter to a session management function (SMF), so that the SMF determines a target user plane function (UPF)/protocol data unit (PDU) session anchor (PSA) for performing NAT translation on a received data packet according to the NAT parameter; and configuring a third NAT parameter for the target AS according to the NAT parameter, and migrating the data service from the source AS to the target AS, so that the target AS performs NAT translation on the data packet according to the third NAT parameter.

20 Claims, 15 Drawing Sheets

(56) References Cited

U.S. PATENT DOCUMENTS

| | | | | |
|---|---|---|---|---|
| 2005/0013280 | A1* | 1/2005 | Buddhikot | H04L 69/32 |
| | | | | 370/352 |
| 2007/0147395 | A1* | 6/2007 | Chen | H04L 61/2557 |
| | | | | 370/428 |
| 2018/0324646 | A1 | 11/2018 | Lee et al. | |
| 2019/0007500 | A1* | 1/2019 | Kim | H04L 67/141 |
| 2020/0329008 | A1* | 10/2020 | Dao | H04L 61/5007 |
| 2021/0051761 | A1* | 2/2021 | Kahn | H04W 80/10 |
| 2021/0149706 | A1* | 5/2021 | Liu | G06F 9/45558 |
| 2021/0203710 | A1* | 7/2021 | Burnette | H04W 8/04 |
| 2021/0314220 | A1* | 10/2021 | Chou | H04L 41/022 |
| 2022/0224646 | A1* | 7/2022 | Xiong | H04L 45/02 |
| 2023/0232322 | A1* | 7/2023 | Singh | H04W 8/26 |
| | | | | 370/329 |

OTHER PUBLICATIONS

Tencent Technology, WO, PCT/CN2022/073418, Apr. 14, 2022, 5 pgs.

Tencent Technology, IPRP, PCT/CN2022/073418, dated Aug. 15, 2023, 6 pgs.

Tencent Technology, ISR, PCT/CN2022/073418, dated Apr. 14, 2022, 2 pgs.

* cited by examiner

METHOD FOR IMPLEMENTING COMMUNICATION CONTINUITY AND RELATED DEVICE

CROSS-REFERENCE TO RELATED APPLICATIONS

This application is a continuation application of PCT Patent Application No. PCT/CN2022/073418, entitled "METHOD FOR IMPLEMENTING COMMUNICATION CONTINUITY AND RELATED DEVICE" filed on Jan. 24, 2022, which claims priority to Chinese Patent Application No. 202110184916.7, filed with the State Intellectual Property Office of the People's Republic of China on Feb. 10, 2021, and entitled "METHOD FOR IMPLEMENTING COMMUNICATION CONTINUITY AND RELATED DEVICE", all of which are incorporated herein by reference in their entirety.

FIELD OF THE TECHNOLOGY

The present disclosure relates to the field of communication technologies, and specifically, to a method for implementing communication continuity, an application function (AF) device, a target application server (AS), a session management function (SMF) device, user equipment (UE), and a computer-readable storage medium.

BACKGROUND OF THE DISCLOSURE

After an AS is migrated, a network address of the AS is changed. In this case, communication between UE and the AS is interrupted, to interrupt service communication that is being performed. Therefore, a technical problem that needs to be resolved is: when the UE moves, how to migrate the AS, so as to keep service continuity (for example, the communication delay is very little); or when the AS is migrated while the UE does not move, how to keep service continuity (for example, the communication delay is very little).

In the related art, after the AS is migrated to a target AS network address of a target AS, the context of the target AS is changed, and the Internet Protocol (IP) protocol stack related context of the source AS is all seamlessly modified onto target AS network address information, so that after being migrated to the target AS network address information, the AS still keeps IP communication continuity with the UE.

However, this manner is based on the premise that after being migrated, the AS has a capability of modifying the IP protocol stack context of a kernel. Therefore, this manner is not a technology that may be standardized and widely used, that is, this capability is not available.

SUMMARY

Embodiments of the present disclosure provide a method for implementing communication continuity, an AF device, a target AS, an SMF device, UE, and a computer-readable storage medium, to keep communication continuity when an AS of UE migrates.

An embodiment of the present disclosure provides a method for implementing communication continuity performed by a computer device acting as an application function (AF) device corresponding to user equipment (UE), the UE establishing a wireless connection to a source application server (AS) using allocated UE source network address information, the method comprising: determining a data service migration from the source AS to a target AS; transmitting a first network address translation (NAT) parameter to a session management function (SMF), wherein the SMF determines a target user plane function (UPF)/protocol data unit (PDU) session anchor (PSA), and the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter; obtaining the second NAT parameter from the SMF; and configuring a third NAT parameter for the target AS according to the second NAT parameter, and migrating the data service from the source AS to the target AS, so that the target AS performs NAT translation on the data packet according to the third NAT parameter.

An embodiment of the present disclosure provides a method for implementing communication continuity, applicable to a target AS, the method including: configuring a third NAT parameter using an AF, the third NAT parameter being generated according to a second NAT parameter of a target UPF/PSA; obtaining a data packet, the data packet being a data packet generated after the target UPF/PSA performs NAT translation according to the second NAT parameter or a data packet generated by the target AS; performing NAT translation on the data packet according to the third NAT parameter; and transmitting, in a case that the data packet is a data packet generated by the target AS, a data packet generated after performing NAT translation according to the third NAT parameter to the target UPF/PSA, so that the target UPF/PSA performs NAT translation again according to the second NAT parameter.

An embodiment of the present disclosure provides a method for implementing communication continuity, applicable to an SMF corresponding to UE, the UE establishing a connection to a source AS using allocated UE source network address information, the method including: obtaining a first NAT parameter from an AF; determining a target UPF/PSA, so that the target UPF/PSA reallocates UE target network address information to the UE and causes the UE to continue to use the UE source network address information; transmitting the first NAT parameter to the target UPF/PSA, so that the target UPF/PSA generates a second NAT parameter according to the first NAT parameter, the UE target network address information, and the UE source network address information; receiving the second NAT parameter from the target UPF/PSA, the target UPF/PSA being configured to perform NAT translation on a received data packet according to the second NAT parameter; and transferring the second NAT parameter to the AF, so that the AF configures a third NAT parameter for a target AS according to the second NAT parameter and migrates from the source AS to the target AS, the target AS being configured to perform NAT translation on the data packet according to the third NAT parameter.

An embodiment of the present disclosure provides a method for implementing communication continuity, applicable to UE, the UE establishing a connection to a source AS using allocated UE source network address information, the method including: transmitting an uplink (UL) data packet to a target UPF/PSA, so that the target UPF/PSA performs first NAT translation on the UL data packet according to a second UL NAT parameter, generates a first-NAT-translated UL data packet, and transmits the first-NAT-translated UL data packet to a target AS, the target AS being configured to perform second NAT translation on the first-NAT-translated UL data packet according to a third UL NAT parameter; and receiving a downlink (DL) data packet through the target UPF/PSA, the target AS being configured to perform third NAT translation on the DL data packet according to a third DL NAT parameter, and the target UPF/PSA being configured to perform fourth NAT translation on a third-NAT-translated DL data packet according to a second DL NAT parameter.

An embodiment of the present disclosure provides a computer device acting as an AF device, including: one or more processors; and a memory, configured to store one or more programs, the one or more programs, when executed by the one or more processors, causing the computer device to implement the method according to any one of the foregoing embodiments.

An embodiment of the present disclosure provides a target AS, including: one or more processors; and a memory, configured to store one or more programs, the one or more programs, when executed by the one or more processors, causing the one or more processors to implement the method according to any one of the foregoing embodiments.

An embodiment of the present disclosure provides an SMF device, including: one or more processors; and a memory, configured to store one or more programs, the one or more programs, when executed by the one or more processors, causing the one or more processors to implement the method according to any one of the foregoing embodiments.

An embodiment of the present disclosure provides UE, including: one or more processors; and a memory, configured to store one or more programs, the one or more programs, when executed by the one or more processors, causing the one or more processors to implement the method according to any one of the foregoing embodiments.

An embodiment of the present disclosure provides a non-transitory computer-readable storage medium, storing a computer program, the program, when executed by a processor, implementing the method for implementing communication continuity according to the foregoing embodiments.

An embodiment of the present disclosure provides a computer device, including: one or more processors; and a memory, configured to store one or more programs, the one or more programs, when executed by the one or more processors, causing the computer device to implement the method for implementing communication continuity according to the foregoing embodiments.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various optional implementations.

In technical solutions provided in some embodiments of the present disclosure, after UE establishes a connection to and performs communication with a source AS using allocated UE source network address information, in a case that an AF determines to migrate from the source AS to a target AS, the AF may transmit a first NAT parameter to an SMF. In this way, after receiving the first NAT parameter, the SMF may reselect a target UPF/PSA, the target UPF/PSA may reallocate new UE target network address information to the UE, and the target UPF/PSA may generate a second NAT parameter according to the original UE source network address information and the reallocated UE target network address information of the UE, and the first NAT parameter, so that when the target UPF/PSA receives a data packet, the target UPF/PSA may perform NAT translation on the data packet according to the second NAT parameter. The target UPF/PSA may transmit the second NAT parameter to the SMF, the SMF may then transfer the second NAT parameter to the AF, and the AF may further configure a third NAT parameter for the target AS according to the received second NAT parameter. In this way, when obtaining the data packet, the target AS may perform NAT translation on the obtained data packet according to the third NAT parameter, that is, the same data packet undergoes NAT translation of the target UPF/PSA and the target AS twice, so that a source address and a destination address of the data packet finally obtained by the target AS and a source address and a destination address initially transmitted by the UE remain unchanged, or a source address and a destination address of the data packet finally obtained by the UE and a source address and a destination address initially transmitted by the target AS remain unchanged. In an aspect, using an NAT technology, service continuity can be kept when the AS migrates; in another aspect, a kernel does not need to be modified after the AS migrates, which is easy to implement, is an available technology that reliably implements communication continuity after the AS migrates, and is easy to perform standardization and large-scale deployment.

DESCRIPTION OF EMBODIMENTS

According to the embodiments of the present disclosure, the processes described below by referring to the flowcharts may be implemented as computer software programs. For example, the embodiments of the present disclosure include a computer program product, the computer program product includes a computer program carried on a computer-readable storage medium, and the computer program includes program code used for performing the methods shown in the flowcharts.

In another aspect, this application further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement steps shown in FIG. 3, FIG. 4, FIG. 5, FIG. 6, FIG. 8, FIG. 10, FIG. 11, FIG. 12, or FIG. 13.

EC minimizes a communication time delay between UE and an AS by deploying the AS close to the UE. Implementation of EC includes two basic architectures, respectively shown in FIG. 1 and FIG. 2.

Figure 1:
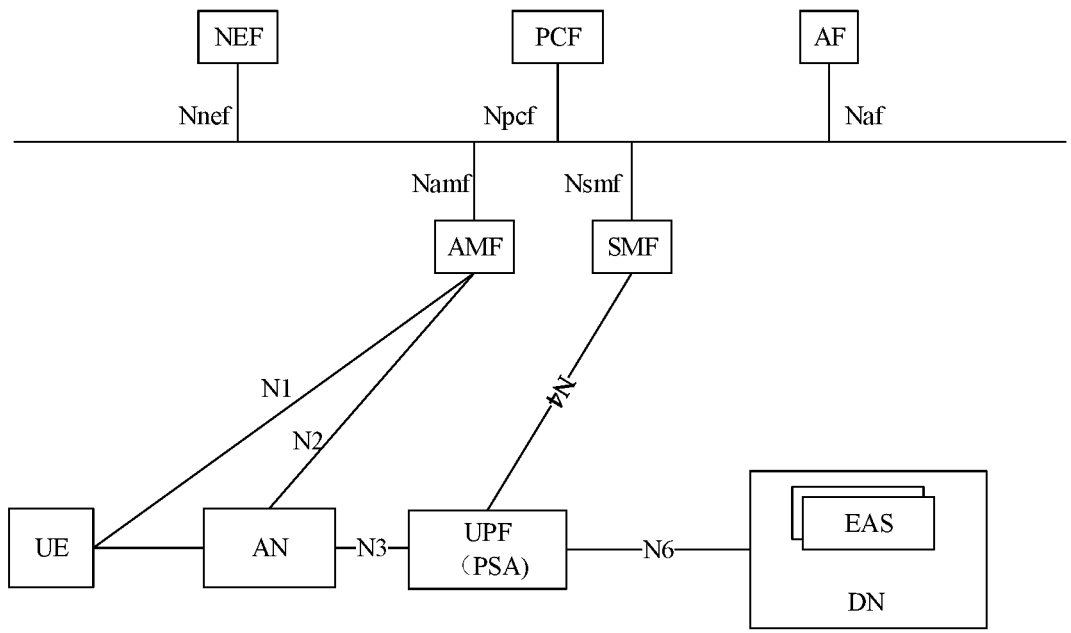
FIG. 1 is a schematic diagram of an edge computing (EC) architecture in the related art.

In FIG. 1, a UPF/PSA is deployed near an access network (AN), and meanwhile an edge AS (EAS) is deployed in a data network (DN) connected to the PSA.

Figure 2:
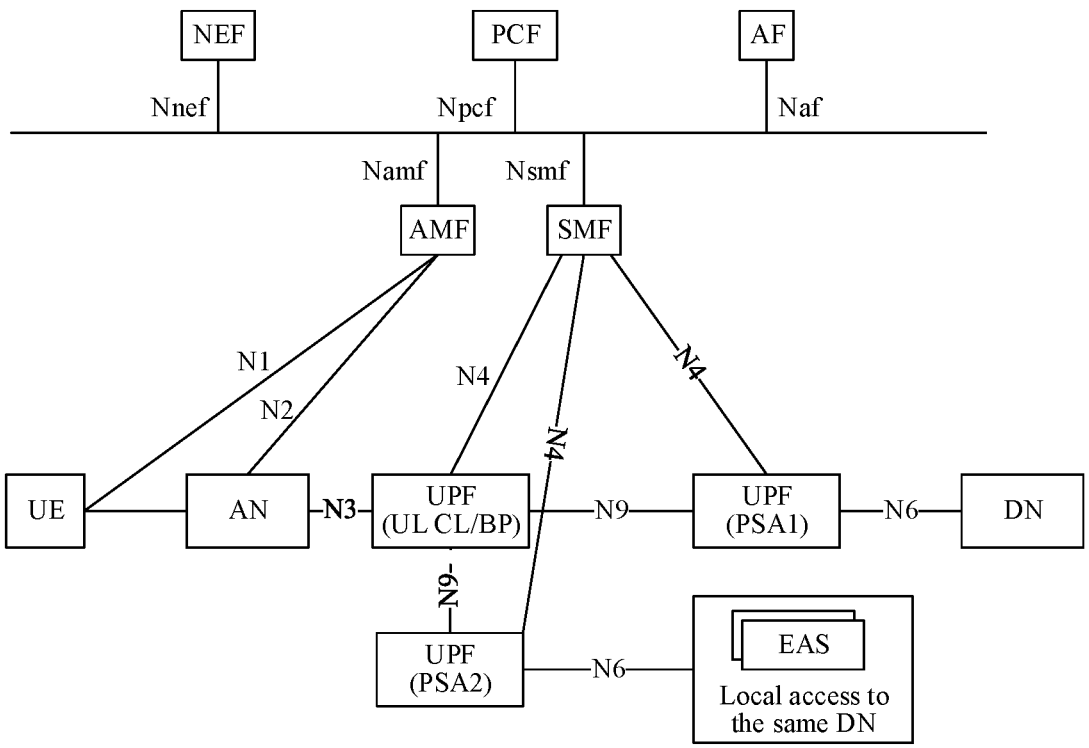
FIG. 2 is a schematic diagram of another EC architecture in the related art.

In FIG. 2, when UPF/PSA1 (also referred to as source user plane function protocol data unit session anchor below, whose abbreviation is source UPF/PSA) is deployed in a center position, a UL classifier (UL CL)/branching point (BP) is deployed near an AN, then UPF/PSA2 (also referred to as target user plane function protocol data unit session anchor, whose abbreviation is target UPF/PSA, occasionally also represented using PSA2) near the AN branches off, and an EAS is deployed in the same locally accessed DN connected to PSA2.

That is, FIG. 1 does not use the UL CL/BP to access the EAS, while FIG. 2 uses the UL CL/BP to access the EAS.

In FIG. 1 and FIG. 2, the full name of NEF is Network Exposure Function, and Nnef refers to a Nnef message for obtaining a service provided by the NEF. The full name of PCF is Policy Control Function, and Npcf refers to a Npcf message for obtaining a service provided by the PCF. The full name of AF is Application Function, and Naf refers to a Naf message for obtaining a service provided by the AF. The full name of AMF is Access and Mobility Management Function, and Namf refers to a Namf message for obtaining a service provided by the AMF. The full name of SMF is Session Management Function, and Nsmf refers to a Nsmf message for obtaining a service provided by the SMF. The UE interacts with the AMF through an N1 interface, the AMF interacts with the AN through an N2 interface, the SMF interacts with UPFs through an N4 interface, the AN interacts with the UPF through an N3 interface, another UPF interacts with the DN through an N6 interface, and the UPFs interact with each other through an N9 interface.

Figure 3:
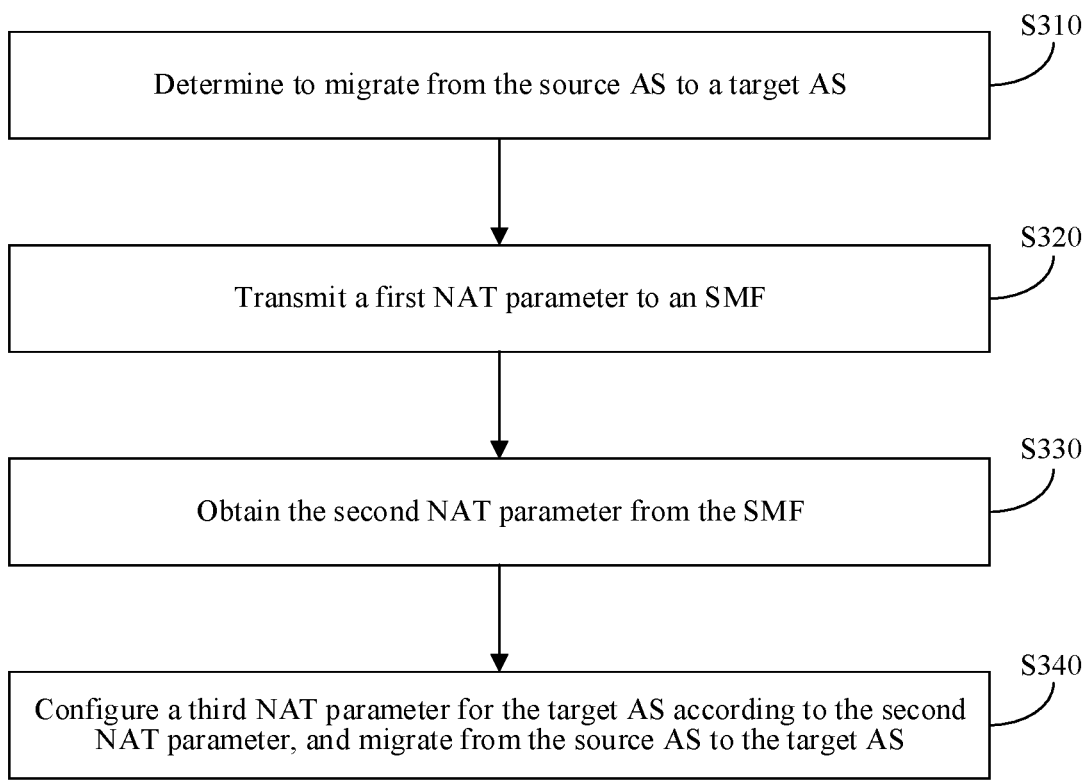
FIG. 3 is a schematic flowchart of a method for implementing communication continuity according to an embodiment of the present disclosure.

FIG. 3 is a schematic flowchart of a method for implementing communication continuity according to an embodiment of the present disclosure. The method provided in this embodiment in FIG. 3 is applicable to an AF corresponding to UE, and the UE establishes a connection to a source AS using allocated UE source network address information, but the present disclosure is not limited thereto.

The UE source network address information may include a UE source IP address (represented as IPue1) and a source UE port number (represented as PORTue1).

As shown in FIG. 3, the method provided in this embodiment of the present disclosure may include the following steps:

Step S310: Determine to migrate from the source AS to a target AS.

Figure 9:
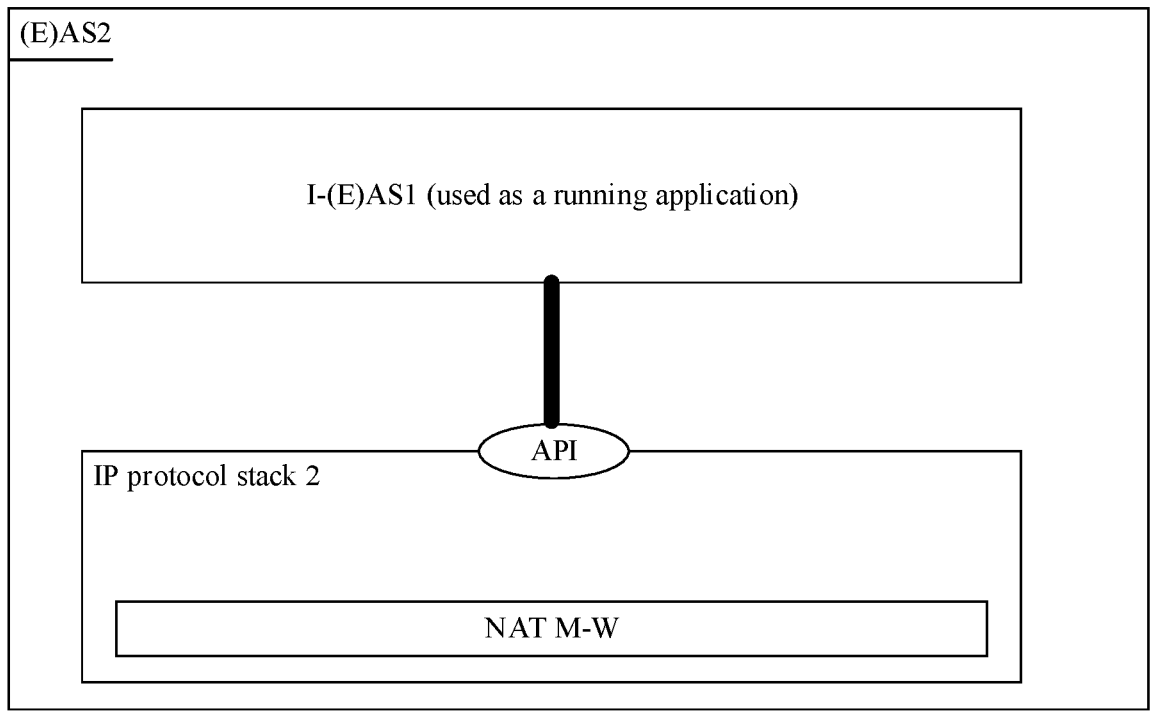
FIG. 9 is a schematic architectural diagram of a target AS according to another embodiment of the present disclosure.
Figure 10:
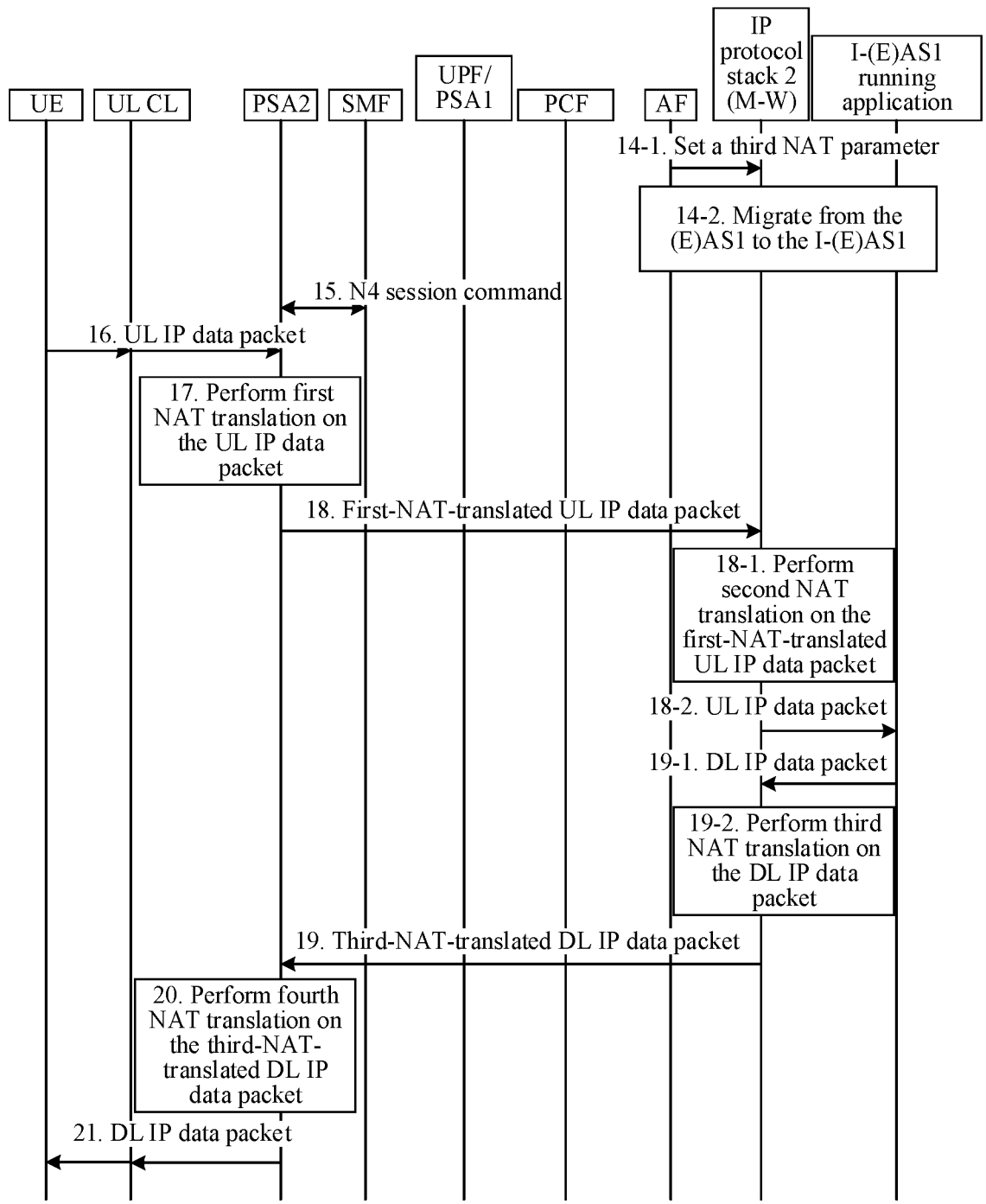
FIG. 10 is a schematic interaction diagram of a method for implementing communication continuity based on the target AS shown in FIG. 9.

The migration in this embodiment of the present disclosure refers to moving from the source AS functionally to the target AS, which may include but not limited to two morphologies:

1) Application migration, which may include the following embodiment in FIG. 9 and FIG. 10.

The application migration is a process of moving a software application from a computing environment to another computing environment, and includes migrating the application from a data center to another data center, from a public cloud to a private cloud, or from a local deployment server of a corporation to a computing environment of a cloud service provider.

Figure 6:
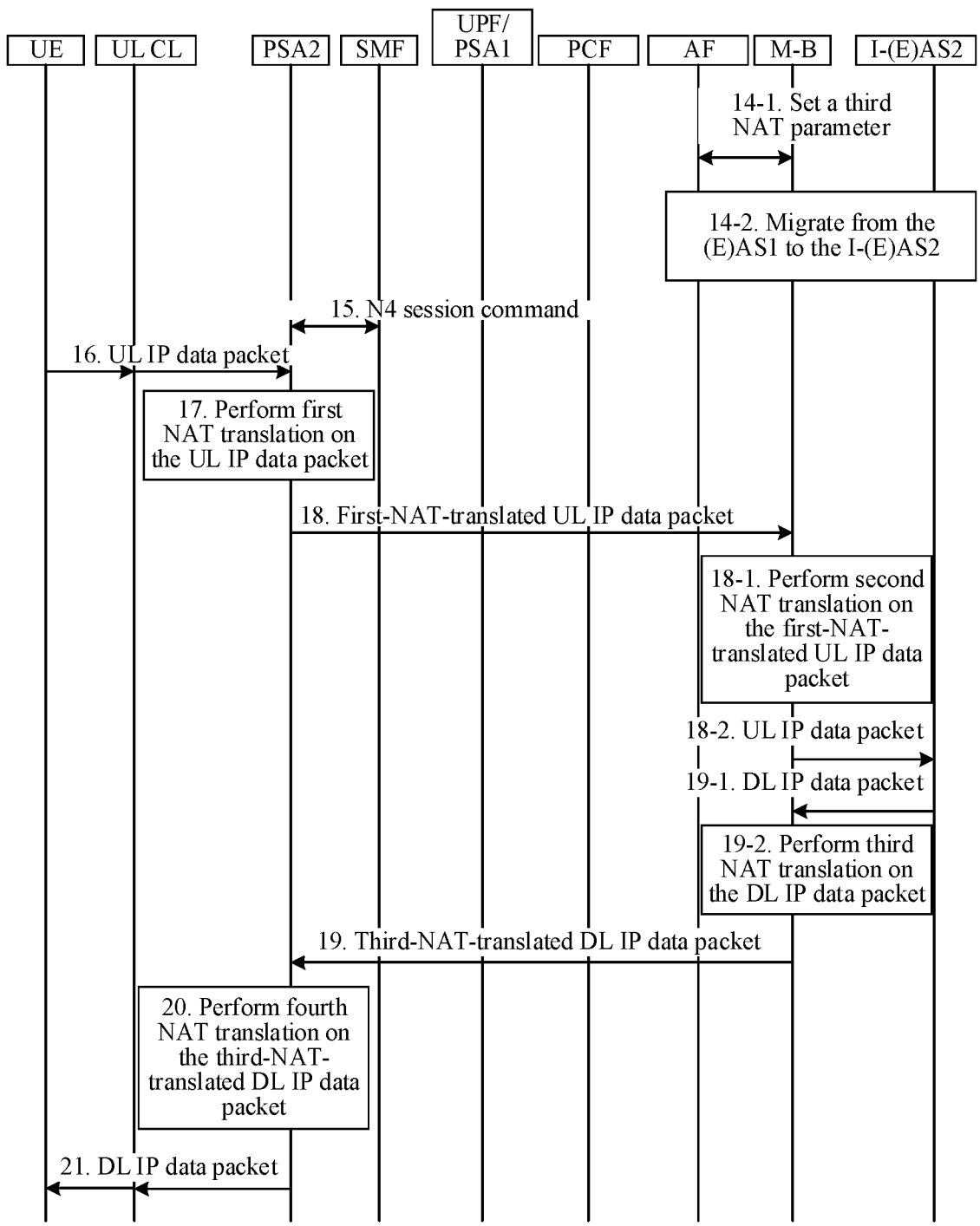
FIG. 6 is a schematic interaction diagram of a method for implementing communication continuity according to still another embodiment of the present disclosure.
Figure 7:
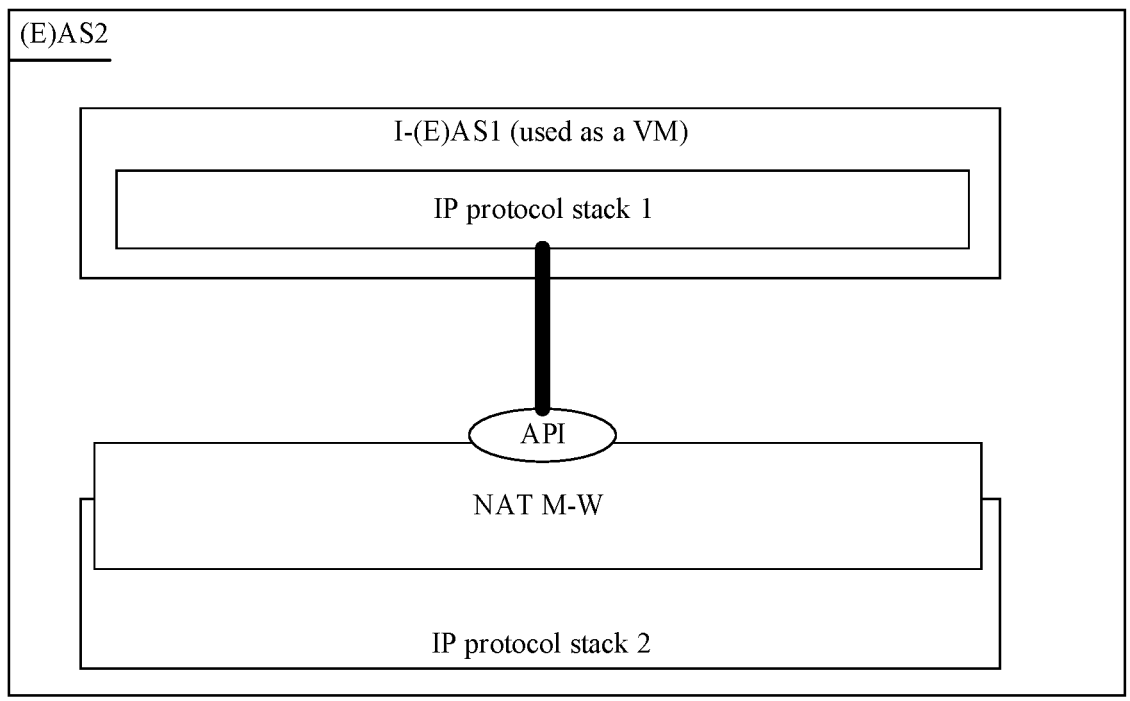
FIG. 7 is a schematic architectural diagram of a target AS according to an embodiment of the present disclosure.
Figure 8:
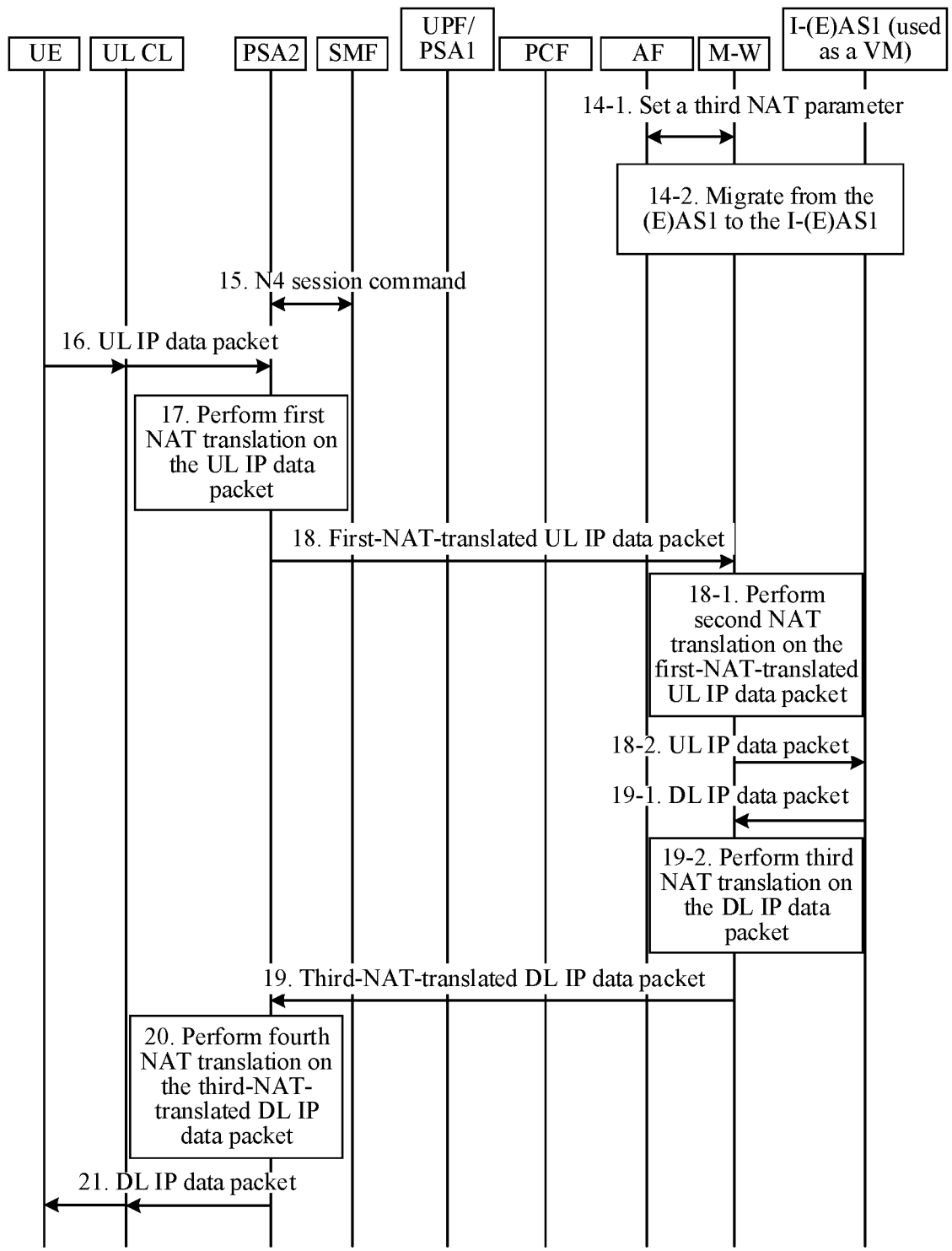
FIG. 8 is a schematic interaction diagram of a method for implementing communication continuity based on the target AS shown in FIG. 7.

2) Server migration, which may include the following embodiments in FIG. 6, FIG. 7 and FIG. 8.

The server migration refers to migrating a cloud host including an Internet data center (IDC) server, a virtual machine (VM), or another cloud platform or another type of server from a place to another place (for example, migration between data centers, public clouds, private clouds, center clouds, or edge clouds).

The server migration may also include but not limited to physical server migration (similar to movement after a computer is dormant) and VM migration, that is, migrate a VM from a place to another place. This VM migration is also divided into live migration and cold migration.

The physical server migration may migrate a physical server to the cloud by booting a Migrate for Compute Engine Connector ISO image from a device such as a virtual or physical Digital Video Disc (DVD), a Read-Only Memory (ROM)/Compact Disk (CD) to a random access memory (RAM). A Migrate for Compute Engine connector maps local storage of a physical server, and creates a stub VMware VM as a management object for Migrate for Compute Engine cloud migration operations.

The "determining" in this embodiment of the present disclosure means that the AF makes a decision to migrate from the source AS to the target AS, that is, when the AF determines to migrate from the source AS to the target AS, migration has not been implemented, but is implemented in subsequent steps.

The technical solution proposed in this embodiment of the present disclosure not only may resolve the EC problem, but also may resolve the non-EC problem. Therefore, unless particularly described below, the problem does not particularly refer to the EC problem, that is, the (E)AS mentioned below may be an EAS or may be an AS. (E)AS1 is used below for representing a source AS or source EAS, and corresponds to source AS network address information that may include a source AS IP address (represented as IPas1)

and a source AS port number (represented as PORTas1); (E)AS2 is used below for representing a target AS or target EAS, and corresponds to target AS network address information that may include a target AS IP address (represented as IPas2) and a target AS port number (represented as PORTas2).

In an exemplary embodiment, the determining to migrate from the source AS to a target AS may include: receiving an event exposure early notification message from the SMF; and determining to migrate from the source AS to the target AS according to the event exposure early notification message.

In an exemplary embodiment, the determining to migrate from the source AS to a target AS may include: receiving a traffic influence early notification message from an NEF, where the NEF being configured to receive an event exposure early notification message from the SMF and transmit the traffic influence early notification message to the AF according to the event exposure early notification message.

Step S320: Transmit a first NAT parameter to an SMF, so that the SMF determines a target UPF/PSA, the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter.

In this embodiment of the present disclosure, the AF transmits the first NAT parameter to the SMF, the first NAT parameter being used for indicating that NAT translation is performed, and after receiving the first NAT parameter, the SMF reselects UPF/PSA2 different from UPF/PSA1 as the target UPF/PSA. The target UPF/PSA (that is, UPF/PSA2) reallocates UE target network address information to the UE, where the UE target network address information may include a UE target IP address (represented as IPue2) and a target UE port number (represented as PORTue2). UPF/PSA2 may generate a second NAT parameter according to the first NAT parameter, the UE source network address information and the UE target network address information, and return the second NAT parameter to the SMF. UPF/PSA2 may further perform different NAT translation respectively on the received data packet (may include a UL data packet transmitted by the UE, and may further include a DL data packet transmitted by the target AS and undergoing NAT translation once) according to the second NAT parameter.

In an exemplary embodiment, the first NAT parameter may include target AS network address information of the target AS, and the target AS network address information includes a target AS IP address and a target AS port number.

In an exemplary embodiment, the transmitting a first NAT parameter to an SMF may include: transmitting an event exposure application relocation message to the SMF, the event exposure application relocation message carrying the target AS IP address and the target AS port number.

In an exemplary embodiment, the transmitting a first NAT parameter to an SMF may include: transmitting a traffic influence application relocation information message to an NEF, the traffic influence application relocation information message carrying the target AS IP address and the target AS port number, so that the NEF transmits an event exposure application relocation message to the SMF, the event exposure application relocation message carrying the target AS IP address and the target AS port number.

In an exemplary embodiment, the transmitting a first NAT parameter to an SMF may include: transmitting a policy authorization create/update request message to a PCF. The policy authorization create/update request message carries the target AS IP address and the target AS port number, so that the PCF transmits a session management policy control update notification message to the SMF. The session management policy control update notification message carries the target AS IP address and the target AS port number Step S330: Obtain the second NAT parameter from the SMF.

Step S340: Configure a third NAT parameter for the target AS according to the second NAT parameter, and migrate from the source AS to the target AS, so that the target AS performs NAT translation on the data packet according to the third NAT parameter.

In an exemplary embodiment, the data packet may include a UL data packet transmitted by the UE. The second NAT parameter includes a second UL NAT parameter. The target UPF/PSA may be configured to perform first NAT translation on the UL data packet according to the second UL NAT parameter. The third NAT parameter may include a third UL NAT parameter. The source AS network address information of the source AS may include a source AS IP address. The configuring a third NAT parameter for the target AS according to the second NAT parameter may include: generating the third UL NAT parameter according to the second UL NAT parameter.

In an exemplary embodiment, the target AS includes a middle-box (M-B) and an internal target AS. The M-B and the internal target AS are different network entities, and perform communication through a network connection. A network address of the M-B is the target AS IP address. The configuring a third NAT parameter for the target AS according to the second NAT parameter, and migrating from the source AS to the target AS may include: configuring the third UL NAT parameter for the M-B, so that the M-B performs second NAT translation on a first-NAT-translated UL data packet according to the third UL NAT parameter, to obtain a second-NAT-translated UL data packet, and transmits the second-NAT-translated UL data packet to the internal target AS through a network connected to the internal target AS; and using a source AS IP address of the source AS as a network address of the internal target AS, so that the internal target AS receives the second-NAT-translated UL data packet from the M-B through the network connected to the M-B. Because the UL IP data packet obtained by the target AS and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, and the third NAT parameter may further include a third DL NAT parameter. The configuring a third NAT parameter for the target AS according to the second NAT parameter, and migrating from the source AS to the target AS may further include: generating the third DL NAT parameter according to the second DL NAT parameter; and configuring the third DL NAT parameter for the M-B, so that the M-B performs, according to the third DL NAT parameter, third NAT translation on a DL data packet transmitted by the internal target AS, and transmits the third-NAT-translated DL data packet to the target UPF/PSA, and the target UPF/PSA is further configured to perform fourth NAT translation on the third-NATtranslated DL data packet according to the second DL NAT parameter, to obtain the fourth-NAT-translated DL data packet, and transmit the fourth-NAT-translated DL data packet to the UE. The DL data packet received by the UE and the previously received DL data packet are the same and have the same source IP address, source port number, target IP address, and target port number, so that data connection continuity of the DL data packet may be implemented, thereby implementing continuity of the DL IP service.

In an exemplary embodiment, the target AS may include first NAT middleware (M-W) and an internal source AS. The configuring a third NAT parameter for the target AS according to the second NAT parameter, and migrating from the source AS to the target AS may include: configuring the third UL NAT parameter for the first NAT M-W, so that the first NAT M-W performs second NAT translation on a first-NAT-translated UL data packet according to the third UL NAT parameter, to obtain a second-NAT-translated UL data packet, and transmits the second-NAT-translated UL data packet to the internal source AS; and copying an image of a running environment of the source AS (for example, after the source AS migrates to the target AS through a VM migration technology, the source AS actually remains unchanged) to the internal source AS (so that a network address of the internal source AS is the source AS IP address), so that the internal source AS receives the second-NAT-translated UL data packet through the first NAT M-W. Because the UL IP data packet obtained by the target AS and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, and the third NAT parameter may further include a third DL NAT parameter. The configuring a third NAT parameter for the target AS according to the second NAT parameter, and migrating from the source AS to the target AS may further include: generating the third DL NAT parameter according to the second DL NAT parameter; and configuring the third DL NAT parameter for the first NAT M-W, so that the first NAT M-W performs, according to the third DL NAT parameter, third NAT translation on a DL data packet transmitted by the internal source AS, and transmits the third-NAT-translated DL data packet to the target UPF/PSA, and the target UPF/PSA is further configured to perform fourth NAT translation on the third-NAT-translated DL data packet according to the second DL NAT parameter, to obtain the fourth-NAT-translated DL data packet, and transmit the fourth-NAT-translated DL data packet to the UE. The DL data packet received by the UE and the previously received DL data packet are the same and have the same source IP address, source port number, target IP address, and target port number, so that data connection continuity of the DL data packet may be implemented, thereby implementing continuity of the DL IP service.

In an exemplary embodiment, the target AS may include a target IP protocol stack and an internal source AS running application, and the target IP protocol stack may include second NAT M-W. The configuring a third NAT parameter for the target AS according to the second NAT parameter, and migrating from the source AS to the target AS may include: transmitting the third UL NAT parameter to the target IP protocol stack, so that the third UL NAT parameter is configured for the second NAT M-W, and the second NAT M-W performs second NAT translation on a first-NAT-translated UL data packet according to the third UL NAT parameter, to obtain a UL data packet whose destination address is the source AS IP address; and copying a running application of the source AS to the target AS to obtain the internal source AS running application, and using the internal source AS running application as a running application of the source AS (causing a network address of the target IP protocol stack to be the target AS IP address), so that the internal source AS running application receives, from the target IP protocol stack, the UL data packet whose destination address is the source AS IP address. Because the UL IP data packet obtained by the target AS and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, and the third NAT parameter may further include a third DL NAT parameter. The configuring a third NAT parameter for the target AS according to the second NAT parameter, and migrating from the source AS to the target AS may further include: generating the third DL NAT parameter according to the second DL NAT parameter; and transmitting the third DL NAT parameter to the target IP protocol stack, so that the third DL NAT parameter is configured for the second NAT M-W, and the second NAT M-W performs, according to the third DL NAT parameter, third NAT translation on a DL data packet transmitted by the internal source AS running application, and transmits the third-NAT-translated DL data packet to the target UPF/PSA, and the target UPF/PSA is further configured to perform fourth NAT translation on the third-NAT-translated DL data packet according to the second DL NAT parameter, to obtain the fourth-NAT-translated DL data packet, and transmit the fourth-NAT-translated DL data packet to the UE. The DL data packet received by the UE and the previously received DL data packet are the same and have the same source IP address, source port number, target IP address, and target port number, so that data connection continuity of the DL data packet may be implemented, thereby implementing continuity of the DL IP service.

In an exemplary embodiment, the UE source network address information may include a UE source IP address and a source UE port number, the UE target network address information may include a UE target IP address and a target UE port number, and the source AS network address information may further include a source AS port number.

The second UL NAT parameter may be used for indicating that the target UPF/PSA translates a source address of the UL data packet from the UE source IP address into the UE target IP address and translates a destination address of the UL data packet from the source AS IP address into the target AS IP address; and the third UL NAT parameter may be used for indicating that the target AS translates a source address of a first-NAT-translated UL data packet from the UE target IP address into the UE source IP address and translates a destination address of the first-NAT-translated UL data packet from the target AS IP address into the source AS IP address; or the second UL NAT parameter may be used for indicating that the target UPF/PSA translates a source address of the UL data packet from the UE source IP address into the UE target IP address, translates a destination address of the UL data packet from the source AS IP address into the target AS IP address, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a destination address of the first-NAT-translated UL data packet from the target AS IP address into the source AS IP address, and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address, translates a destination address of the UL data packet from the source AS IP address into the target AS IP address, and translates a source port of the UL data packet from the source UE port number into the target UE port number; and the third UL NAT parameter may be used for indicating that the target AS translates a source address of a first-NAT-translated UL data packet from the UE target IP address into the UE source IP address, translates a destination address of the first-NAT-translated UL data packet from the target AS IP address into the source AS IP address, and translates a source port of the first-NAT-translated UL data packet from the target UE port number into the source UE port number; or the second UL NAT parameter may be used for indicating that the target UPF/PSA translates a source address of the UL data packet from the UE source IP address into the UE target IP address, translates a destination address of the UL data packet from the source AS IP address into the target AS IP address, translates a source port of the UL data packet from the source UE port number into the target UE port number, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a destination address of the first-NAT-translated UL data packet from the target AS IP address into the source AS IP address, translates a source port of the first-NAT-translated UL data packet from the target UE port number into the source UE port number, and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address and translates a target port of the UL data packet from the source AS port number into the target AS port number; and the third UL NAT parameter may be used for indicating that the target AS translates a source address of a first-NAT-translated UL data packet from the UE target IP address into the UE source IP address and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address, translates a source port of the UL data packet from the source UE port number into the target UE port number, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a source port of the first-NAT-translated UL data packet from the target UE port number into the source UE port number, and translates a target port of the first-NAT-translated UL data packet from the target AS port number into the source AS port number.

In an exemplary embodiment, the third DL NAT parameter may be used for indicating that the target AS translates a source address of the DL data packet from the source AS IP address into the target AS IP address and translates a destination address of the DL data packet from the UE source IP address into the UE target IP address; and the second DL NAT parameter may be used for indicating that the target UPF/PSA translates a source address of the third-NAT-translated DL data packet from the target AS IP address into the source AS IP address and translates a destination address of the third-NAT-translated DL data packet from the UE target IP address into the UE source IP address; or the third DL NAT parameter may be used for indicating that the target AS translates a source address of the DL data packet from the source AS IP address into the target AS IP address, translates a destination address of the DL data packet from the UE source IP address into the UE target IP address, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, and translates a target port of the third-NAT-translated DL data packet from the target UE port number into the source UE port number; or the third DL NAT parameter may be used for indicating that the target AS translates a source address of the DL data packet from the source AS IP address into the target AS IP address, translates a destination address of the DL data packet from the UE source IP address into the UE target IP address, and translates a source port of the DL data packet from a source AS port number of the source AS into a target AS port number of the target AS; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, and translates a source port of the third-NAT-translated DL data packet from the target AS port number into the source AS port number; or the third DL NAT parameter may be used for indicating that the target AS translates a source address of the DL data packet from the source AS IP address into the target AS IP address, translates a destination address of the DL data packet from the UE source IP address into the UE target IP address, translates a source port of the DL data packet from a source AS port number of the source AS into a target AS port number of the target AS, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, translates a source port of the third-NAT-translated DL data packet from the target AS port number into the source AS port number, and translates a target port of the third-NAT-translated DL data packet from the target UE port number into the source UE port number; or the third DL NAT parameter may be used for indicating that the target AS translates a source address of the DL data packet from the source AS IP address into the target AS IP address and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address and translates a target port of the third-NAT-translated DL data packet from the target UE port number into the source UE port number; or the third DL NAT parameter may be used for indicating that the target AS translates a source address of the DL data packet from the source AS IP address into the target AS IP address, translates a source port of the DL data packet from a source AS port number of the source AS into a target AS port number of the target AS, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a source port of the third-NAT-translated DL data packet from the target AS port number into the source AS port number, and translates a target port of the third-NAT-translated DL data packet from the target UE port number into the source UE port number.

Specifically, the NAT translation in this embodiment of the present disclosure may be any one of the following six cases:

1) Translation of the source address and the destination address of the UL data packet or DL data packet.

In this case, after the target UPF/PSA receives a UL data packet transmitted by the UE, the target UPF/PSA translates a source address of the UL data packet from IPue1 into IPue2 and a destination address of the UL data packet from IPas1 into IPas2 according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1 and a destination address of the first-NAT-translated UL data packet from IPas2 into IPas1 according to the third UL NAT parameter, to obtain a second-NAT-translated UL data packet, and after undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1 and a destination address is IPue1, and the target AS performs third NAT translation on the DL data packet according to the third DL NAT parameter, that is, translates the source address of the DL data packet from IPas1 into IPas2 and the destination address from IPue1 into IPue2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1 and the destination address from IPue2 into IPue1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

2) Translation of the source address, the destination address and the target port of the UL data packet or DL data packet.

In this case, after the target UPF/PSA receives a UL data packet transmitted by the UE, the target UPF/PSA translates a source address of the UL data packet from IPue1 into IPue2, a destination address from the IPas1 into IPas2, and a target port from PORTas1 into PORTas2 according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1, a destination address from IPas2 into IPas1, and a target port from PORTas2 into PORTas1 according to the third UL NAT parameter, so as to obtain the second-NAT-translated UL data packet. After undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1, a destination address is IPue1, and a target port is PORTue1, and the target AS performs third NAT translation on the DL data packet according to the third DL NAT parameter, that is, translates the source address of the DL data packet from IPas1 into IPas2, the destination address from IPue1 into IPue2, and the target port from PORTue1 into PORTue2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1, the destination address from IPue2 into IPue1, and the target port from PORTue2 into PORTue1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

3) Translation of the source address, the source port and the destination address of the UL data packet or DL data packet.

In this case, after the target UPF/PSA receives a UL data packet transmitted by the UE, the target UPF/PSA translates a source address of the UL data packet from IPue1 into IPue2, a destination address from the IPas1 into IPas2, and a source port from PORTue1 into PORTue2 according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1, a destination address from IPas2 into IPas1, and a source port from PORTue2 into PORTue1 according to the third UL NAT parameter, so as to obtain the second-NAT-translated UL data packet. After undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1, a destination address is IPue1, and a source port is PORTas1, and the target AS performs third NAT translation on the DL data packet according to the third DL NAT parameter, that is, translates the source address of the DL data packet from IPas1 into IPas2, the destination address from IPue1 into IPue2, and the source port from PORTas1 into PORTas2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1, the destination address from IPue2 into IPue1, and the source port from PORTas2 into PORTas1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

4) Translation of the source address, the source port, the destination address and the target port of the UL data packet or DL data packet.

In this case, after the target UPF/PSA receives a UL data packet transmitted by the UE, the target UPF/PSA translates a source address of the UL data packet from IPue1 into IPue2, a destination address from the IPas1 into IPas2, a source port from PORTue1 into PORTue2, and a target port from PORTas1 into PORTas2, according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1, a destination address from IPas2 into IPas1, a source port from PORTue2 into PORTue1, and a target port from PORTas2 into PORTas1 according to the third UL NAT parameter, so as to obtain the second-NAT-translated UL data packet. After undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1, a destination address is IPue1, a source port is PORTas1, and a target port is PORTue1, and the target AS performs third NAT translation on the DL data packet according to the third DL NAT parameter, that is, translates the source address of the DL data packet from IPas1 into IPas2, the destination address from IPue1 into IPue2, the source port from PORTas1 into PORTas2, and the target port from PORTue1 into PORTue2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1, the destination address of the third-NAT-translated DL data packet from IPue2 into IPue1, the source port of the third-NAT-translated DL data packet from PORTas2 into PORTas1, and the target port of the third-NAT-translated DL data packet from PORTue2 into PORTue1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

5) Translation of the source address and the target port of the UL data packet or DL data packet.

In this case, after the target UPF/PSA receives a UL data packet transmitted by the UE, the target UPF/PSA translates a source address of the UL data packet from IPue1 into IPue2 and a target port of the UL data packet from PORTas1 into PORTas2 according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1, and a target port from PORTas2 into PORTas1 according to the third UL NAT parameter, so as to obtain the second-NAT-translated UL data packet. After undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1 and a target port is PORTue1, and the target AS performs third NAT translation on the DL data packet according to the third DL NAT parameter, that is, translates the source address of the DL data packet from IPas1 into IPas2 and the target port from PORTue1 into PORTue2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1, and the target port from PORTue2 into PORTue1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

6) Translation of the source address, the source port and the target port of the UL data packet or DL data packet.

In this case, after the target UPF/PSA receives a UL data packet transmitted by the UE, the target UPF/PSA translates a source address of the UL data packet from IPue1 into IPue2, a source port from the PORTue1 into PORTue2, and a target port from PORTas1 into PORTas2 according to the second UL NAT parameter, to obtain a first-NAT-translated UL data packet, and transmits the first-NAT-translated UL data packet to the target AS; after receiving the first-NAT-translated UL data packet from the target UPF/PSA, the target AS translates a source address of the first-NAT-translated UL data packet from IPue2 into IPue1, a source port of the first-NAT-translated UL data packet from PORTue2 into PORTue1, and a target port of the first-NAT-translated UL data packet from PORTas2 into PORTas1 according to the third UL NAT parameter, so as to obtain the second-NAT-translated UL data packet. After undergoing NAT translation twice, the second-NAT-translated UL data packet is the UL data packet initially transmitted by the UE, that is, has the same source IP address, source Port Number, target IP address, and target Port Number.

The target AS generates a DL data packet to be transmitted to the UE, where a source address of the DL data packet is IPas1, a source port is PORTas1, and a target port is PORTue1, and the target AS performs third NAT translation on the DL data packet according to the third DL NAT parameter, that is, translates the source address of the DL data packet from IPas1 into IPas2, the source port from PORTas1 into PORTas2, and the target port from PORTue1 into PORTue2, to obtain a third-NAT-translated DL data packet, and transmits the third-NAT-translated DL data packet to the target UPF/PSA. The target UPF/PSA receives the third-NAT-translated DL data packet, and translates the source address of the third-NAT-translated DL data packet from IPas2 into IPas1, the source port of the third-NAT-translated DL data packet from PORTas2 into PORTas1, and the target port of the third-NAT-translated DL data packet from PORTue2 into PORTue1 according to the second DL NAT parameter, so as to obtain a fourth-NAT-translated DL data packet. After undergoing NAT translation twice, the fourth-NAT-translated DL data packet is the DL data packet initially transmitted by the target AS, that is, has the same source IP address, source Port Number, target IP address, and target Port Number.

In the foregoing 5) and 6), for the UL data packet, the destination address is not translated. In this case, it may be considered that the target AS and the source AS are located in the same local area network, that is, IPas1 is equal to IPas2.

In each of the following exemplary descriptions, an exemplary description is made using the foregoing 4) as an example, that is, the source address, source port, destination address and target port of the UL data packet or DL data packet are translated simultaneously, but the present disclosure is not limited thereto.

In the method for implementing communication continuity provided in the implementation of the present disclosure, after UE establishes a connection to and performs communication with a source AS using allocated UE source network address information, in a case that an AF determines to migrate from the source AS to a target AS, the AF may transmit a first NAT parameter to an SMF. In this way, after receiving the first NAT parameter, the SMF may reselect a target UPF/PSA, the target UPF/PSA may reallocate new UE target network address information to the UE, and the target UPF/PSA may generate a second NAT parameter according to the original UE source network address information and the reallocated UE target network address information of the UE, and the first NAT parameter, so that when the target UPF/PSA receives a data packet, the target UPF/PSA may perform NAT translation on the data packet according to the second NAT parameter. The target UPF/PSA may transmit the second NAT parameter to the SMF, the SMF may then transfer the second NAT parameter to the AF, and the AF may further configure a third NAT parameter for the target AS according to the received second NAT parameter. In this way, when obtaining the data packet, the target AS may perform NAT translation on the obtained data packet according to the third NAT parameter, that is, the same data packet undergoes NAT translation of the target UPF/PSA and the target AS twice, so that a source address and a destination address of the data packet finally obtained by the target AS and a source address and a destination address initially transmitted by the UE remain unchanged, or a source address and destination address of the data packet finally obtained by the UE and a source address and a destination address initially transmitted by the target AS remain unchanged. In an aspect, using an NAT technology, service continuity can be kept when the AS migrates; in another aspect, a kernel does not need to be modified after the AS migrates, which is easy to implement, is an available technology that reliably implements communication continuity after the AS migrates, and is easy to perform standardization and large-scale deployment.

The method provided in this embodiment in FIG. 3 is exemplarily described below with reference to FIG. 4 to FIG. 10.

Figure 4:
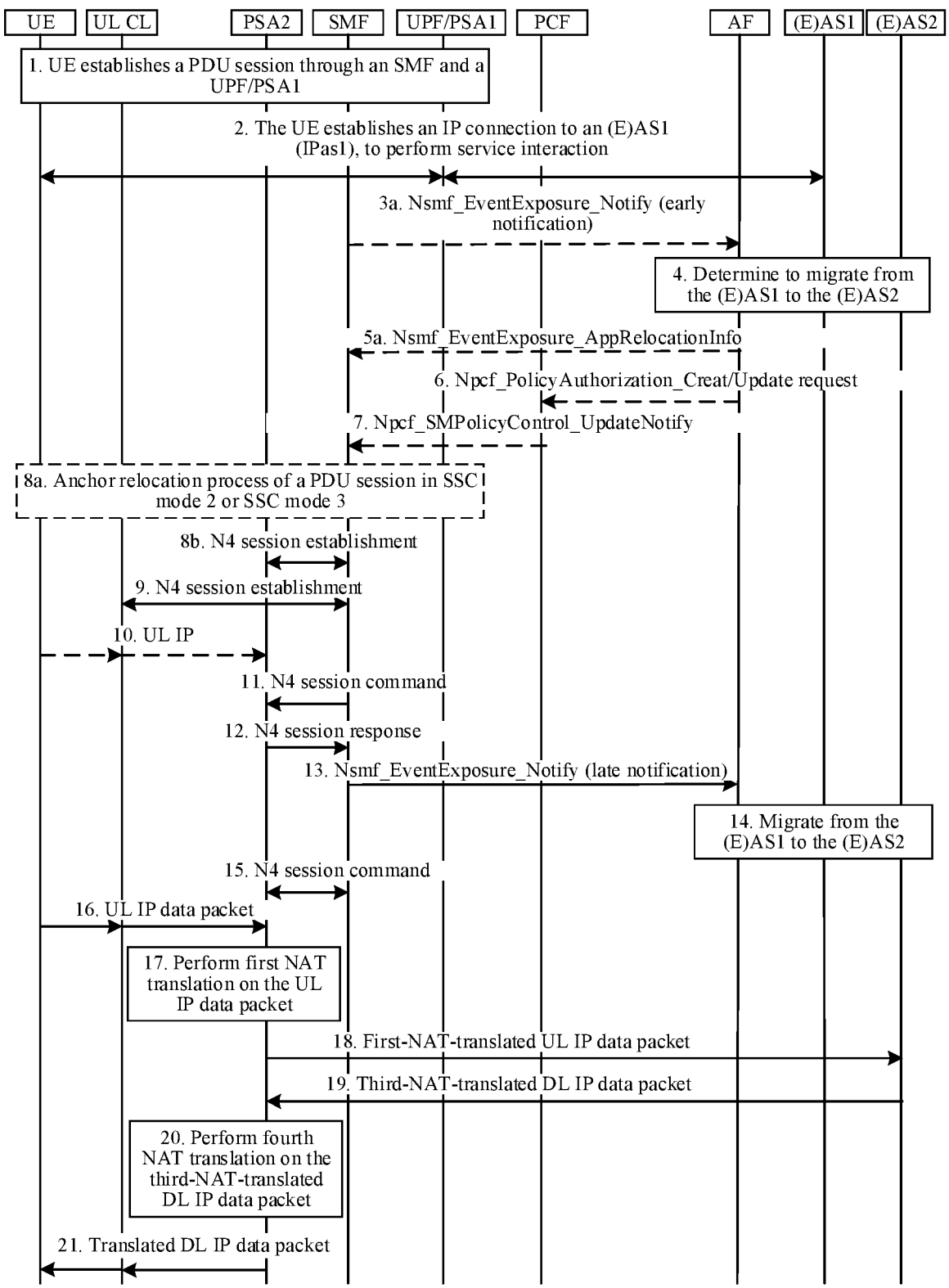
FIG. 4 is a schematic interaction diagram of a method for implementing communication continuity according to an embodiment of the present disclosure.

FIG. 4 is a schematic interaction diagram of a method for implementing communication continuity according to an embodiment of the present disclosure.

In step 1 of this embodiment in FIG. 4, UE establishes a PDU session through an SMF and a UPF/PSA1.

In step 2 of this embodiment in FIG. 4, the UE establishes an IP connection to an (E)AS1 (whose corresponding network address is represented as IPas1), to perform service interaction.

The UPF/PSA1 allocates an IP address represented as IPue1 to the UE. The UE establishes an IP connection to the (E)AS1 through the allocated IPue1, to perform IP communication. For information about a UL data packet and a DL data packet, reference may be, for example, made respectively to step 16 and step 21 in FIG. 4.

In step 3a of this embodiment in FIG. 4, the SMF transmits Nsmf_EventExposure_Notify (early notification) to an AF.

In this embodiment of the present disclosure, the early notification is represented as Early Notification, and the following late notification is represented as Late Notification.

If finding that the UE is far away from the original position, the SMF determines to trigger migration from the (E)AS1 to a target AS (E)AS2 closer to the UE, and therefore transmits Nsmf_EventExposure_Notify (Early Notification), that is, event exposure early notification message to the AF.

In step 4 of this embodiment in FIG. 4, after receiving Nsmf_EventExposure_Notify (Early Notification) from the SMF, the AF determines to migrate from the (E)AS1 to the (E)AS2.

In this embodiment of the present disclosure, the AF may determine according to Nsmf_EventExposure_Notify (Early Notification) transmitted by the SMF to migrate from the (E)AS1 to the (E)AS2, but in another embodiment, the AF may alternatively autonomously trigger migration from the (E)AS1 to the other target AS (E)AS2 (for example, the (E)AS1 will be overloaded soon). Therefore, step 3a in FIG. 4 is optional, but this is not limited in the present disclosure.

In step 5a of this embodiment in FIG. 4, the AF transmits Nsmf_EventExposure_AppRelocationInfo (IPas2 and PORTas2) to the SMF.

If step 3a in FIG. 4 is performed, the AF transmits Nsmf_EventExposure_AppRelocationInfo (IPas2 and PORTas2), that is, event exposure application relocation message to the SMF, and the event exposure application relocation message includes IPas2 of the (E)AS2. Optionally, the event exposure application relocation message may further include a port number of the (E) AS2 communicating with the UE, that is, PORTas2. Step 5a in FIG. 4 is also optional.

In step 6 of this embodiment in FIG. 4, the AF transmits a Npcf_PolicyAuthorization_Create/Update request (IPas2 and PORTas2) to a PCF.

In a case that neither step 3a nor step 5a in FIG. 4 is performed, but the AF initiates a route update command, the AF transmits a Npcf_PolicyAuthorization_Create/Update request, that is, policy authorization create/update request message to the PCF, and the policy authorization create/update request message includes IPas2, and optionally, may further include PORTas2.

In step 7 of this embodiment in FIG. 4, after receiving the Npcf_PolicyAuthorization_Create/Update request (IPas2 and PORTas2) from the AF, the PCF transmits Npcf_SMPolicyControl_UpdateNotify (IPas2 and PORTas2) to the SMF.

The PCF transmits Npcf_SMPolicyControl_UpdateNotify, that is, session management policy control update notification message to the SMF, and the session management policy control update notification message includes IPas2, and optionally, may further include PORTas2. Step 6 and step 7 in FIG. 4 are optional.

Step 8a of this embodiment in FIG. 4 is optional, that is, an anchor relocation process of a PDU session in session and service continuity (SSC) mode 2 or SSC mode 3 (allocated IPue2 is not transferred to the UE).

In a case that the SMF determines to initiate anchor relocation of a PDU session in SSC mode 2 or SSC mode 3, the SMF selects a new PSA2 for the SSC mode 2 and SSC mode 3, and the PSA2 allocates a new IPue2 address to the UE, but this IPue2 address may not be transferred to the UE, that is, the UE still uses previous IPue1 (the UE is required to use the previous IP address). However, in the following step 17, the PSA2 translates previous IPue1 into new IPue2 through NAT translation. The PSA2 allocates corresponding core network (CN) tunnel information, and transmits the CN tunnel information to the SMF, and the SMF selects a new UL CL/BP as a target UL CL/BP, and then configures the CN tunnel information for the UL CL/BP and a radio AN (RAN, not shown in FIG. 4).

The CN tunnel information may include a general packet radio service (GPRS) tunnel protocol-user (GTP-U) tunnel IP address and tunnel endpoint identifier (TEID) information.

In step 8b of this embodiment in FIG. 4, the SMF transmits an N4 session establishment request message to the PSA2, and the PSA2 returns an N4 session establishment response message to the SMF.

In a case that step 8a is not performed, but the SMF determines to add or modify the PSA2 of the UL CL/BP, the SMF selects a new PSA2, and the PSA2 allocates a new IPue2 address to the UE, but this IPue2 address is not transferred to the UE, that is, the UE still uses previous IPue1. However, in the following step 17, the PSA2 translates previous IPue1 into new IPue2 through NAT translation. The PSA2 allocates corresponding CN tunnel information, and transmits the CN tunnel information to the SMF.

Manners in which the AF transfers the first NAT parameter to the SMF are not limited to the foregoing listed several manners.

In the foregoing steps 8a and 8b, the SMF further transmits indication information to the PSA2, to instruct the PSA2 to first buffer the UL data packet before receiving a data transmission notification.

In step 9 of this embodiment in FIG. 4, the SMF transmits an N4 session establishment request message to the UL CL/BP, and the UL CL/BP returns an N4 session establishment response message to the SMF.

The SMF selects a new UL CL/BP, and then configures, for the UL CL/BP and the RAN, the CN tunnel information allocated by the PSA2.

In step 10 of this embodiment in FIG. 4, if the UE transmits a UL IP data packet, that is, UL data packet to the UL CL/BP in this case, and the UL CL/BP then transmits the received UL data packet to the PSA2, the PSA2 first buffers the UL data packet in this case, and the PSA2 does not immediately transmit the UL data packet to N6, but buffers the UL data packet, and transmits the UL data packet only after step 15.

In step 11 of this embodiment in FIG. 4, the SMF transmits an N4 session command to the PSA2, to instruct the PSA2 to perform NAT translation and redirection.

The SMF transmits an NAT instruction to the PSA2, to instruct to translate IPas1 and PORTas1 of the (E)AS1 into IPas2 and PORTas2 of the (E)AS2. The NAT instruction may further instruct to translate IPue1 of the UE into new IPue2 of the UE.

In step 12 of this embodiment in FIG. 4, the PSA2 returns an N4 session response to the SMF, where the N4 session response carries the second NAT parameter, and the second NAT parameter includes IPas2, and optionally, may further include PORTas2.

The PSA2 replies to the SMF, and it may be simultaneously indicated in the second NAT parameter that PORTue1 of the UE is translated into PORTue2. The second NAT parameter may include a second UL NAT parameter and a second DL NAT parameter, where the second UL NAT parameter refers to a parameter used by the PSA2 for performing NAT translation on a UL data packet transmitted by the UE, and the second DL NAT parameter refers to a parameter used by the PSA2 for performing NAT translation on a DL data packet received from the target AS (refers to a DL data packet having undergone third NAT translation).

In step 13 of this embodiment in FIG. 4, the SMF transmits Nsmf_EventExposure_Notify (Late Notification, NAT parameters (IPas2 and PORTas2)), that is, event exposure late notification message to the AF.

The SMF notifies the AF through Nsmf_EventExposure_Notify (Late Notification, NAT parameters (IPas2 and PORTas2)) that switching from the (E)AS1 to the (E)AS2 may be performed. The event exposure late notification message includes an NAT parameter, for example, indicating that IPas1 and PORTas1 of the (E)AS1 are translated into IPas2 and PORTas2 of the (E)AS2, IPue1 of the UE is translated into new IPue2 of the UE, and PORTue1 of the UE is translated into PORTue2.

In step 14 of this embodiment in FIG. 4, the AF migrates from the (E)AS1 to the (E)AS2.

After receiving Nsmf_EventExposure_Notify (Late Notification, NAT parameters (IPas2 and PORTas2)), the AF migrates from the (E)AS1 to the (E)AS2, and the IP address of the (E)AS2 has been changed to IPas2.

In step 15 of this embodiment in FIG. 4, the SMF transmits an N4 session command (that is, data transmission notification) to the PSA2, so as to give a notification that the PSA2 may begin transmitting a UL data packet and receiving a DL data packet through an N6 interface, and meanwhile the PSA2 also needs to perform NAT translation.

In step 16 of this embodiment in FIG. 4, the UE transmits a UL IP data packet (that is, the foregoing UL data packet), that is, UL data packet to the UL CL/BP, and the UL CL/BP then forwards the UL data packet to the PSA2.

For example, the UE continues to transmit a UL data packet, whose source address is IPue1, destination address is IPas1, source port is PORTue1, and target port is PORTas1, and the UL data packet may further include a transmission protocol, that is, represented as UL IP data packet (source IPue1, target IPas1, source port PORTue1, target port PORTas1, transmission protocol).

In step 17 of this embodiment in FIG. 4, the PSA2 performs first NAT translation on the UL data packet according to the second UL NAT parameter, to obtain a first-NAT-translated UL data packet.

For example, the PSA2 performs first NAT translation on the UL IP data packet, to translate IPas1 and PORTas1 into IPas2 and PORTas2, IPue1 into IPue2, and PORTue1 into PORTue2, to obtain a first-NAT-translated UL IP data packet (source IPue2, target IPas2, source port PORTue2, target port PORTas2, transmission protocol).

In step 18 of this embodiment in FIG. 4, the PSA2 transmits the first-NAT-translated UL data packet to the (E)AS2.

For example, the PSA2 transmits the first-NAT-translated UL IP data packet (source IPue2, target IPas2, source port PORTue2, target port PORTas2, transmission protocol) to the (E)AS2.

After receiving the first-NAT-translated UL IP data packet (source IPue2, target IPas2, source port PORTue2, target port PORTas2, transmission protocol), the (E)AS2 further performs second NAT translation on the first-NAT-translated UL IP data packet, so as to obtain the UL IP data packet (source IPue1, target IPas1, source port PORTue1, target port PORTas1, transmission protocol). For details, reference is made to the following FIG. 6 to FIG. 10. Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In step 19 of this embodiment in FIG. 4, the (E)AS2 generates a DL IP data packet, that is, DL data packet, and transmits the DL data packet to the PSA2.

The (E)AS2 generates a DL data packet, which may be, for example, represented as DL IP data packet (source IPas1, target IPue1, source port PORTas1, target port PORTue1, transmission protocol); after performing third NAT translation on the DL data packet, the (E)AS2 transmits a third-NAT-translated DL data packet to the PSA2. For example, the third-NAT-translated DL data packet may be represented as DL IP data packet (source IPas2, target IPue2, source port PORTas2, target port PORTue2, transmission protocol). For details, reference is made to the following FIG. 6 to FIG. 10.

In step 20 of this embodiment in FIG. 4, after receiving the third-NAT-translated DL data packet transmitted by the target AS, the PSA2 performs, according to the second DL NAT parameter, fourth NAT translation on the third-NAT-translated DL data packet received from the target AS, to obtain a fourth-NAT-translated DL data packet.

For example, the third-NAT-translated DL data packet may be represented as DL IP data packet (source IPas2, target IPue2, source port PORTas2, target port PORTue2, transmission protocol), the PSA2 performs fourth NAT translation on the received third-NAT-translated DL data packet again, to obtain the DL IP data packet (source IPas1, target IPue1, source port PORTas1, target port PORTue1, transmission protocol).

In step 21 of this embodiment in FIG. 4, the PSA2 transmits the fourth-NAT-translated DL data packet to the UL CL/BP, and the UL CL/BP then forwards the fourth-NAT-translated DL data packet to the UE.

For example, the PSA2 transmits the DL IP data packet (source IPas1, target IPue1, source port PORTas1, target port PORTue1, transmission protocol) to the UL CL/BP, and then the DL IP data packet reaches the UE through the RAN. Because the DL IP data packet received by the UE and the DL data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

In this embodiment of the present disclosure, because information about the UL and DL data packets corresponding to the foregoing step 16 and step 21 is consistent with that about the UL and DL data packets in step 2, that is, none of the source address, the destination address, the source port and the target port is changed, the IP connection is kept. Therefore, service continuity is ensured. The manner in which the IP connection can still be kept after the IP address of the (E)AS2 is changed to IPas2 is clarified below through embodiments in FIG. 6 to FIG. 10.

Figure 5:
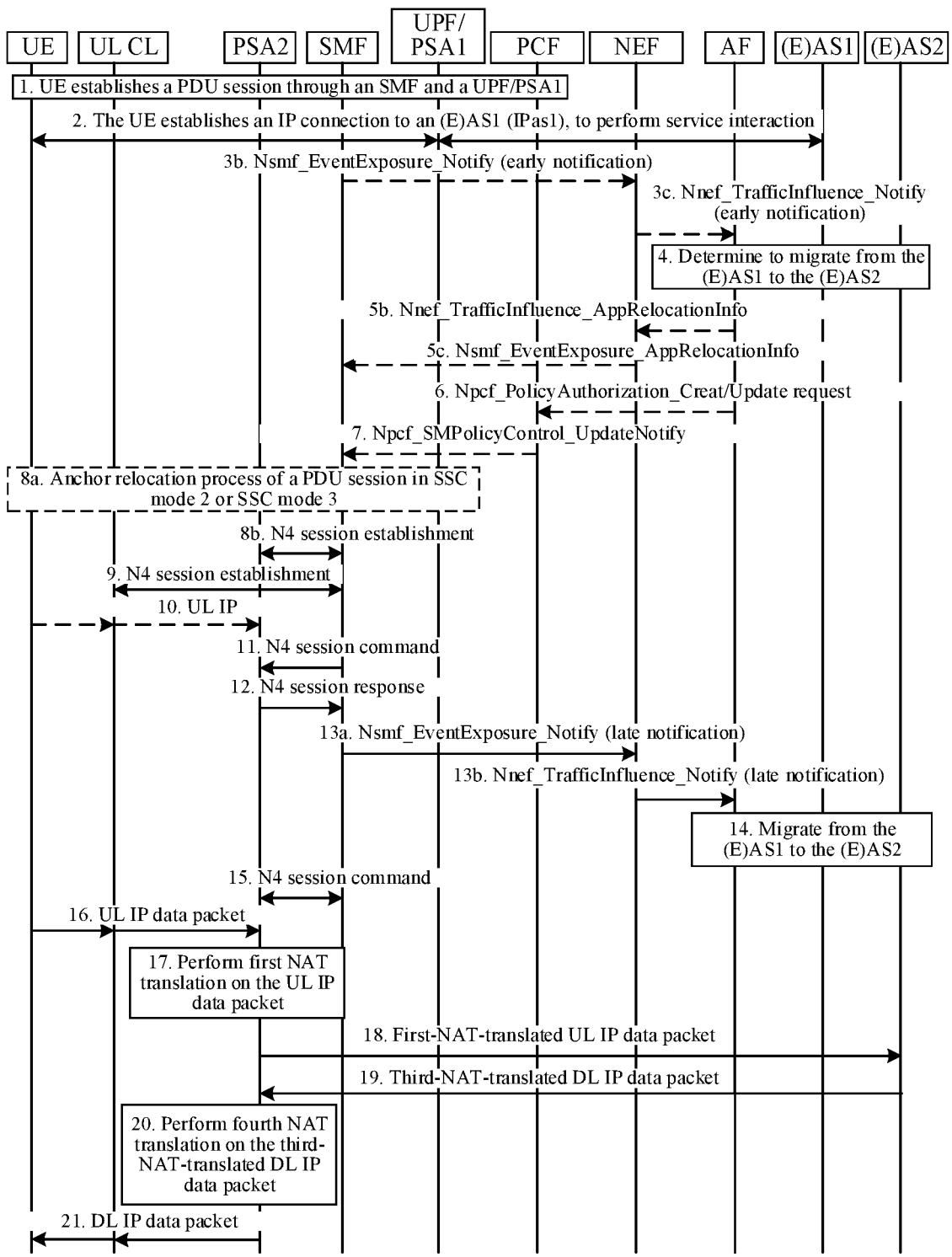
FIG. 5 is a schematic interaction diagram of a method for implementing communication continuity according to another embodiment of the present disclosure.

FIG. 5 is a schematic interaction diagram of a method for implementing communication continuity according to another embodiment of the present disclosure.

This embodiment in FIG. 5 is different from the foregoing embodiment in FIG. 4 in that, step 3a in FIG. 4 is replaced with steps 3b and 3c, step 5a in FIG. 4 is replaced with steps 5b and 5c, and step 13 in FIG. 4 is replaced with steps 13a and 13b.

In step 3b of this embodiment in FIG. 5, the SMF transmits Nsmf_EventExposure_Notify (Early Notification), that is, event exposure early notification message to an NEF.

In step 3c of this embodiment in FIG. 5, after receiving Nsmf_EventExposure_Notify (Early Notification), the NEF then transmits Nnef_TrafficInfluence_Notify (early notification), that is, traffic influence early notification message to an AF.

In step 5b of this embodiment in FIG. 5, the AF transmits Nnef_TrafficInfluence_AppRelocationInfo (IPas2 and PORTas2), that is, traffic influence application relocation information message to the NEF.

In step 5c of this embodiment in FIG. 5, after the NEF receives Nnef_TrafficInfluence_AppRelocationInfo (IPas2 and PORTas2), the NEF transmits Nsmf_EventExposure_AppRelocationInfo (IPas2 and PORTas2), that is, event exposure application relocation message to the SMF.

In step 13a of this embodiment in FIG. 5, the SMF transmits Nsmf_EventExposure_Notify (Late Notification, NAT parameters (IPas2 and PORTas2)), that is, event exposure late notification message to the NEF.

In step 13b of this embodiment in FIG. 5, after receiving Nsmf_EventExposure_Notify (late notification, NAT parameters (IPas2 and PORTas2)), the NEF transmits Nnef_TrafficInfluence_Notify (late notification, NAT parameters (IPas2 and PORTas2)), that is, traffic influence late notification message to the AF.

FIG. 6 is a schematic interaction diagram of a method for implementing communication continuity according to still another embodiment of the present disclosure. The process of this embodiment in FIG. 6 is a detailed process on the side of the AF and the (E)AS2 performed based on FIG. 4 or FIG. 5.

As shown in FIG. 6, the (E)AS2 may include an M-B and an internal target AS (I-(E)AS2). That is, an application of the (E)AS1 and user context data of an entire operating system on which the application runs are migrated to the I-(E)AS2, that is, the I-(E)AS2 keeps the application and the system context completely the same as those of the original (E)AS1, which is equivalent to moving the (E)AS1 to the I-(E)AS2. Moreover, an M-B is deployed in front of the I-(E)AS2. In this way, the M-B and the I-(E)AS2 form an (E)AS2. The M-B and the I-(E)AS2 are different network entities, and perform communication through a network connection. The I-(E)AS2 keeps the address of IPas1 of the (E)AS1 unchanged, and the context connected to the UE unchanged as well.

This embodiment in FIG. 6 is different from the foregoing embodiments in FIG. 4 and FIG. 5 in that, the foregoing step 14 may be divided into step 14-1 and step 14-2, step 18-1 and step 18-2 may be further included after step 18, and step 19-1 and step 19-2 may be further included before step 19.

In step 14-1 of this embodiment in FIG. 6, the AF sets a third NAT parameter on an M-B.

In this embodiment of the present disclosure, the third NAT parameter may include a third UL NAT parameter and a third DL NAT parameter, where the third UL NAT parameter refers to a parameter used by a target AS for performing NAT translation on a first-NAT-translated UL data packet received from a target UPF/PSA, and the third DL NAT parameter refers to a parameter used by the target AS for performing NAT translation on a DL data packet generated by the target AS.

Specifically, the AF may generate the third UL NAT parameter according to the second UL NAT parameter provided in step 13, generate the third DL NAT parameter according to the second DL NAT parameter, and then transmit the third UL NAT parameter and the third DL NAT parameter to the M-B, so as to instruct the M-B to perform NAT translation corresponding to the PSA2.

However, the present disclosure is not limited thereto. For example, the AF may alternatively directly transmit the second UL NAT parameter and the second DL NAT parameter to the target AS, and the target AS itself generates the third UL NAT parameter according to the second UL NAT parameter, and generates the third DL NAT parameter according to the second DL NAT parameter.

For example, for a UL data packet, first NAT translation of the PSA2 is: translating a destination address IPas1 of the UL data packet into IPas2, translating a target port PORTas1 into PORTas2, translating a source address IPue1 of the UL data packet into IPue2, and translating a source port PORTue1 into PORTue2 (see step 17 in FIG. 4), and then the AF requires that second NAT translation of the M-B on a first-NAT-translated UL data packet is: translating IPas2 and PORTas2 into IPas1 and PORTas1, and translating IPue2 and PORTue2 into IPue1 and PORTue1 (see the following step 18-1). Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

For example, for a DL data packet, fourth NAT translation of the PSA2 is: translating a source address IPas2 of the third-NAT-translated DL data packet translates into IPas1, translating a source port PORTas2 into PORTas1, translating a destination address IPue2 of the third-NAT-translated DL data packet into IPue1, and translating a target port PORTue2 into PORTue1 (see step 20), and then the AF requires that third NAT translation of the M-B on the DL data packet is: translating IPue1 and PORTue1 into IPue2 and PORTue2, and translating IPas1 and PORTas1 into IPas2 and PORTas2. Because the DL IP data packet received by the UE and the DL data packet transmitted by the (E)AS1 have the same source IP address, source port number, target IP address, and target port number in this case, data connection continuity of the DL IP packet may be implemented, thereby implementing continuity of the DL IP service.

How does the AF select the M-B for the (E)AS2 is not limited or specified. Additionally, before transmitting an M-B message, the AF has known that an IP address corresponding to the M-B is IPas2, and has provided this IPas2 address to the PSA2 in previous steps.

In step 14-2 of this embodiment in FIG. 6, the AF migrates from the (E)AS1 to the I-(E)AS2, and the I-(E)AS2 keeps all IP context, that is, the IPas1 address of the original (E)AS1 unchanged, and the context connected to the UE unchanged as well.

The AF migrates the user context of the (E)AS1 to the I-(E)AS2, and the I-(E)AS2 keeps IP context, that is, the IPas1 address of the original (E)AS1 unchanged, and the context connected to the UE unchanged as well. That is, in this case, the IP address of the I-(E)AS2 is also IPas1. An external IP address of the M-B is IPas2, and the M-B and the I-(E)AS2 jointly form the (E)AS2. In this way, an external network address of the (E)AS2 is IPas2.

In step 18-1 of this embodiment in FIG. 6, after receiving the first-NAT-translated UL data packet from the PSA2, the M-B performs second NAT translation on the first-NAT-translated UL data packet, to obtain a second-NAT-translated UL data packet.

For example, the M-B performs corresponding second NAT translation on the first-NAT-translated UL data packet, to translate IPas2 and PORTas2 into IPas1 and PORTas1 and translate IPue2 and PORTue2 into IPue1 and PORTue1, that is, obtain a UL IP data packet (source IPue1, target IPas1, source port PORTue1, target port PORTas1, transmission protocol).

In step 18-2 of this embodiment in FIG. 6, the M-B transmits the UL data packet to the I-(E)AS2.

The M-B forwards the second-NAT-translated UL data packet (that is, the UL data packet transmitted by the UE) to the I-(E)AS2. Because none of the source address, the destination address, the source port, the target port and the transmission protocol of the UL data packet is changed, the I-(E)AS2 may seamlessly continue to communicate with the UE.

In step 19-1 of this embodiment in FIG. 6, the I-(E)AS2 generates a DL data packet, and transmits the DL data packet to the M-B.

The I-(E)AS2 transmits the DL data packet, which is assumed, for example, to be a DL IP data packet (source IPas1, target IPue1, source port PORTas1, target port PORTue1, transmission protocol).

In step 19-2 of this embodiment in FIG. 6, after receiving the DL data packet from the I-(E)AS2, the M-B performs third NAT translation on the DL data packet, generates a third-NAT-translated DL data packet, and transmits the third-NAT-translated DL data packet to the PSA2.

For example, the M-B performs third NAT translation on the DL data packet, to translate IPue1 and PORTue1 into IPue2 and PORTue2 and translate IPas1 and PORTas1 into IPas2 and PORTas2, that is, generate the third-NAT-translated DL IP data packet (source IPas2, target IPue2, source port PORTas2, target port PORTue2, transmission protocol).

The PSA2 performs fourth NAT translation on the received third-NAT-translated DL data packet again, and then transmits a fourth-NAT-translated DL data packet to the UE. Because the DL IP data packet received by the UE and the DL IP data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

For each of other steps in FIG. 6, reference may be made to the foregoing embodiments in FIG. 4 and FIG. 5.

FIG. 7 is a schematic architectural diagram of a target AS according to an embodiment of the present disclosure. As shown in FIG. 7, an (E)AS2 may include NAT M-W (first NAT M-W, whose abbreviation is M-W in FIG. 8) and an I-(E)AS1 (internal source AS), and a technology similar to a VM is used on a target AS in which the (E)AS2 is located, that is, an (E)AS1 is migrated to the (E)AS2 to serve as a VM, and is represented using I-(E)AS1.

Similar to the foregoing embodiment in FIG. 6, user context of an application of the (E)AS1 is migrated to the I-(E)AS1, that is, the I-(E)AS1 keeps IP context, that is, the IPas1 address of the original (E)AS1 unchanged, and the context connected to the UE unchanged as well. A piece of NAT M-W is connected between an IP protocol stack 2 on the target AS of the (E)AS2 and the I-(E)AS1, where a function performed by the NAT M-W is the same as a function performed by the M-B in the embodiment in FIG. 6.

It can be known with reference to FIG. 7 that, the I-(E)AS1 has an IP protocol stack 1 of the (E)AS1. The NAT M-W may modify the IP protocol stack 2 of the (E)AS2, so that the NAT M-W obtains the first-NAT-translated UL data packet transmitted by the PSA2, and performs second NAT translation on the first-NAT-translated UL data packet, to obtain a second-NAT-translated UL data packet. The NAT M-W transmits the UL data packet to the I-(E)AS1 through an application programming interface (API) of the NAT M-W.

FIG. 8 is a schematic interaction diagram of a method for implementing communication continuity based on the target AS shown in FIG. 7.

This embodiment in FIG. 8 is different from the foregoing embodiments in FIG. 4 and FIG. 5 in that, the foregoing step 14 may be divided into step 14-1 and step 14-2, step 18-1 and step 18-2 may be further included after step 18, and step 19-1 and step 19-2 may be further included before step 19.

In step 14-1 of this embodiment in FIG. 8, the AF sets a third NAT parameter on M-W. In this embodiment of the present disclosure, the third NAT parameter may include a third UL NAT parameter and a third DL NAT parameter.

Specifically, the AF may generate the third UL NAT parameter according to the second UL NAT parameter provided in step 13, generate the third DL NAT parameter according to the second DL NAT parameter, and then transmit the third UL NAT parameter and the third DL NAT parameter to the M-W, so as to instruct the M-W to perform NAT translation corresponding to the PSA2.

In step 14-2 of this embodiment in FIG. 8, the AF migrates from the (E)AS1 to the I-(E)AS1 (used as a VM), and the I-(E)AS1 (used as a VM) keeps IP context, that is, the IPas1 address of the original (E)AS1 unchanged, and the context connected to the UE unchanged as well.

In step 18-1 of this embodiment in FIG. 8, after receiving the first-NAT-translated UL data packet from the PSA2, the M-W performs second NAT translation on the first-NAT-translated UL data packet, to obtain a second-NAT-translated UL data packet.

In step 18-2 of this embodiment in FIG. 8, the M-W transmits the UL data packet to the I-(E)AS1 (used as a VM). Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In step 19-1 of this embodiment in FIG. 8, the I-(E)AS1 (used as a VM) generates a DL data packet, and transmits the DL data packet to the M-W.

In step 19-2 of this embodiment in FIG. 8, after receiving the DL data packet from the I-(E)AS1 (used as a VM), the M-W performs third NAT translation on the DL data packet, generates a third-NAT-translated DL data packet, and transmits the third-NAT-translated DL data packet to the PSA2, so that the PSA2 performs fourth NAT translation on the third-NAT-translated DL data packet.

The flowchart of this embodiment in FIG. 8 is similar to that of the embodiment in FIG. 6, but the M-B is replaced with the NAT M-W, and the M-B interacts with and the I-(E)AS2 through an external interface, while the NAT M-W interacts with the I-(E)AS1 through an internal interface.

The PSA2 performs fourth NAT translation on the received third-NAT-translated DL data packet again, and then transmits a fourth-NAT-translated DL data packet to the UE. Because the DL IP data packet received by the UE and the DL IP data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

FIG. 9 is a schematic architectural diagram of a target AS according to another embodiment of the present disclosure. As shown in FIG. 9, an (E)AS2 may include an IP protocol stack 2 (target IP protocol stack) and an I-(E)AS1 (internal source AS running application) of the (E)AS2, and the IP protocol stack 2 further includes NAT M-W (second NAT M-W, whose abbreviation is M-W in FIG. 10), migrating from a running application of the (E)AS1 to the (E)AS2. The (E)AS2 has the I-(E)AS1, the I-(E)AS1 being used as the running application of the (E)AS1, but does not have an IP protocol stack 1 of the (E)AS1, and the IP protocol stack 2 obtains a first-NAT-translated UL data packet transmitted by a PSA2, and performs second NAT translation on the first-NAT-translated UL data packet using the NAT M-W in the IP protocol stack 2, to obtain a second-NAT-translated UL data packet. Through its API, the IP protocol stack 2 transmits the UL data packet to the I-(E)AS1 (internal source AS running application).

The embodiment in FIG. 9 is different from the embodiment in FIG. 7 in that, the I-(E)AS1 in the embodiment in FIG. 9 is not used as a VM of the (E)AS1 (the VM of the (E)AS1 is a copy of an operating environment of the (E)AS1 on the VM), and user context of the (E)AS1 is migrated to the (E)AS2. However, because the IP address of the (E)AS2 is changed, a piece of NAT M-W is installed on the (E)AS2 (equivalent to installing a piece of virtual private network (VPN) software in a computer), and IPas2 of the (E)AS2 is mapped to IPas1, that is, from the perspective of the I-(E)AS1, the IP address of the entire server is IPas1, but actually its external IP address is IPas2. In this case, the I-(E)AS1 does not have the IP protocol stack 1. However, the I-(E)AS1 in the embodiment in FIG. 7 has its own virtual network interface card and IP protocol stack 1.

FIG. 10 is a schematic interaction diagram of a method for implementing communication continuity based on the target AS shown in FIG. 9.

This embodiment in FIG. 10 is different from the foregoing embodiments in FIG. 4 and FIG. 5 in that, the foregoing step 14 may be divided into step 14-1 and step 14-2, step 18-1 and step 18-2 may be further included after step 18, and step 19-1 and step 19-2 may be further included before step 19.

In step 14-1 of this embodiment in FIG. 10, the AF sets a third NAT parameter (including a third UL NAT parameter and a third DL NAT parameter) on an IP protocol stack 2, the IP protocol stack 2 further including M-W.

Specifically, the AF may generate the third NAT parameter according to a second NAT parameter, and then transmit the third NAT parameter to the IP protocol stack 2, and the IP protocol stack 2 transfers the third NAT parameter to the M-W therein.

In step 14-2 of this embodiment in FIG. 10, the AF migrates from the (E)AS1 (internal source AS running application) to the I-(E)AS1, and the I-(E)AS1 (internal source AS running application) keeps all IP context, that is, the IPas1 address of the original (E)AS1 unchanged, and the context connected to the UE unchanged as well.

In step 18-1 of this embodiment in FIG. 10, after receiving the first-NAT-translated UL data packet from the PSA2, the IP protocol stack 2 performs second NAT translation on the first-NAT-translated UL data packet using the M-W therein, to obtain a second-NAT-translated UL data packet.

In step 18-2 of this embodiment in FIG. 10, the IP protocol stack 2 transmits the UL data packet to the I-(E)AS1 (internal source AS running application). Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In step 19-1 of this embodiment in FIG. 10, the I-(E)AS1 (internal source AS running application) generates a DL data packet, and transmits the DL data packet to the IP protocol stack 2.

In step 19-2 of this embodiment in FIG. 10, after receiving the DL data packet from the I-(E)AS1 (internal source AS running application), the IP protocol stack 2 performs third NAT translation on the DL data packet using the M-W therein, to generate a third-NAT-translated DL data packet, and the IP protocol stack 2 transmits the third-NAT-translated DL data packet to the PSA2.

The PSA2 performs fourth NAT translation on the received third-NAT-translated DL data packet again, and then transmits a fourth-NAT-translated DL data packet to the UE. Because the DL IP data packet received by the UE and the DL IP data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

The flowchart of this embodiment in FIG. 10 is similar to that of the embodiment in FIG. 6, but the M-B is replaced with the NAT M-W, and the M-B interacts with the I-(E)AS2 through an external interface, while the NAT M-W interacts with the I-(E)AS1 through an internal interface.

In the method for implementing communication continuity provided in this implementation of the present disclosure, for a UL data packet, if a previous network (for example, 5G network) performs NAT translation on new IPas2 of the (E)AS2 (performs translation on the IP address of the (E)AS) after migrating from the (E)AS1 to the (E)AS2, NAT translation is performed on the external IP address of the (E)AS2 again, to translate an NAT-translated new external IP address into IPas1 of the (E)AS1 before migration. Therefore, only the external IP address corresponding to the (E)AS2 is changed (that is, changed from IPas1 to IPas2), but the IP address of the (E)AS (the foregoing I-(E)AS2 or I-(E)AS1) in the (E)AS2 is unchanged, that is, still remains as IPas1, thereby implementing communication continuity of the IP address.

For a UL data packet, if a previous 5G network performs NAT translation on new IPas2 of the (E)AS2 and also performs NAT translation on a port parameter (that is, performs translation on both the IP address of the (E)AS and a target port of the (E)AS and/or a source port of the UE) after migrating from the (E)AS1 to the (E)AS2, NAT translation is performed on the external IP address of the (E)AS2 again, to translate an NAT-translated new external IP address into IPas1 of the (E)AS1 before migration, and NAT translation is performed on the translated target port and/or source port. Therefore, only the external IP address corresponding to the (E)AS2 and the target port and/or source port are changed (that is, changed from IPas1 to IPas2, changed from PORTas1 to PORTas2, and/or changed from PORTue1 to PORTue2), but the IP address of the (E)AS (the foregoing I-(E)AS2 or I-(E)AS1) in the (E)AS2 is unchanged, that is, still remains as IPas1, the target port still remains as PORTas1, and/or the source port still remains as PORTue1, thereby implementing communication continuity of the IP address.

Because of bidirectional communication, UL and DL IP data packets are processed symmetrically.

Figure 11:
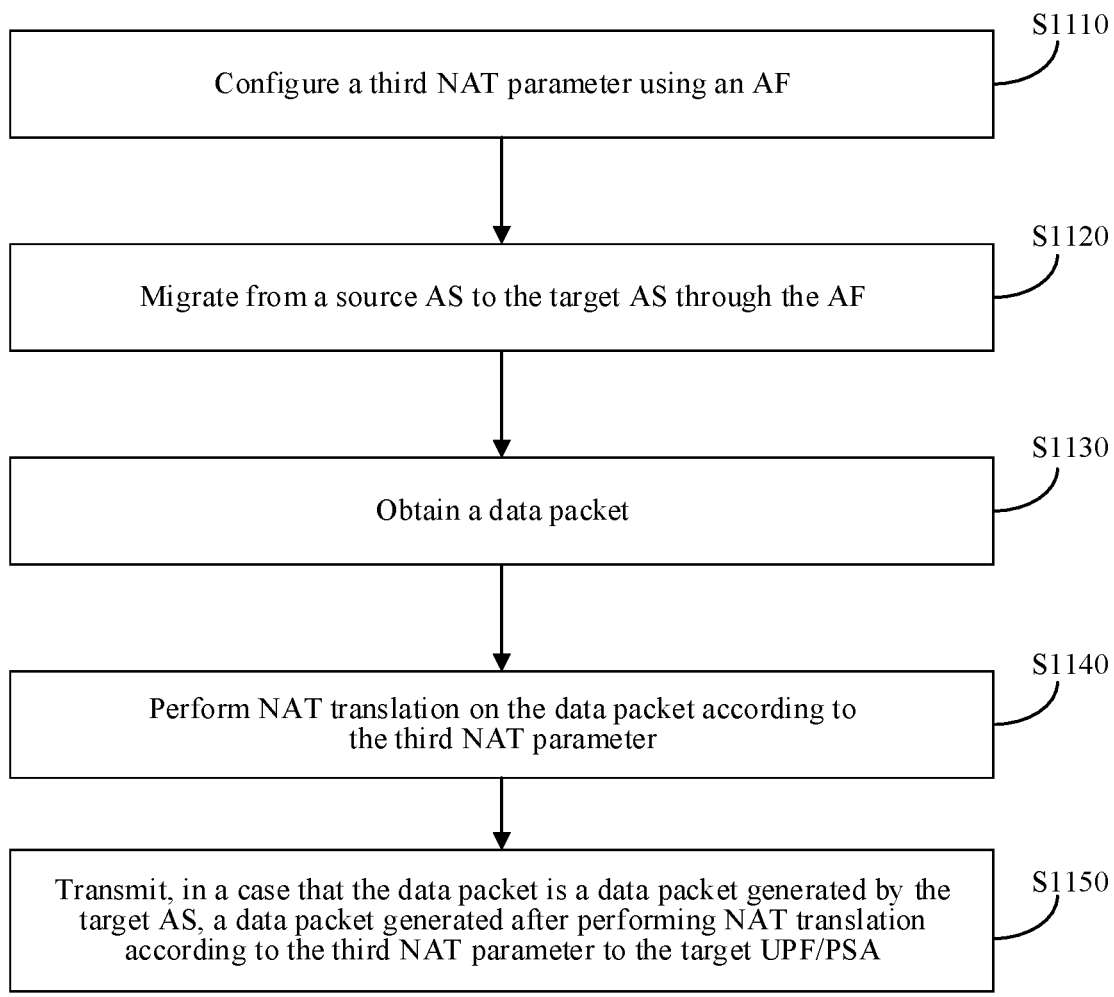
FIG. 11 is a schematic flowchart of a method for implementing communication continuity according to another embodiment of the present disclosure.

FIG. 11 is a schematic flowchart of a method for implementing communication continuity according to another embodiment of the present disclosure. The method provided in this embodiment in FIG. 11 may be applied to a target AS, that is, target AS. As shown in FIG. 11, the method provided in this embodiment of the present disclosure may include the following steps:

Step S1110: Configure a third NAT parameter using an AF, and migrate from a source AS to the target AS, the third NAT parameter being generated according to a second NAT parameter of a target UPF/PSA.

Step S1120: Obtain a data packet, the data packet being a data packet generated after the target UPF/PSA performs NAT translation according to the second NAT parameter or a data packet generated by the target AS.

Step S1130: Perform NAT translation on the data packet according to the third NAT parameter.

Step S1140: Transmit, in a case that the data packet is a data packet generated by the target AS, a data packet generated after performing NAT translation according to the third NAT parameter to the target UPF/PSA, so that the target UPF/PSA performs NAT translation again according to the second NAT parameter.

In an exemplary embodiment, the data packet may include a UL data packet transmitted by the UE, the second NAT parameter may include a second UL NAT parameter, the target UPF/PSA may be configured to perform first NAT translation on the UL data packet according to the second UL NAT parameter, the third NAT parameter may include a third UL NAT parameter, source AS network address information of the source AS may include a source AS IP address, and the AF may be configured to generate the third UL NAT parameter according to the second UL NAT parameter.

In an exemplary embodiment, the target AS may include an M-B and an internal target AS. The M-B and the internal target AS are different network entities, and perform communication through a network connection. A network address of the M-B is a target AS IP address of the target AS. The configuring a third NAT parameter using an AF, and migrating from a source AS to the target AS may include: obtaining, by the M-B, the third UL NAT parameter from the AF; and using the source AS IP address of the source AS as a network address of the internal target AS through the AF. The performing NAT translation on the data packet according to the third NAT parameter may include: receiving, by the M-B, a first-NAT-translated UL data packet from the target UPF/PSA; performing, by the M-B, second NAT translation on the first-NAT-translated UL data packet according to the third UL NAT parameter, to obtain a second-NAT-translated UL data packet; and transmitting, by the M-B, the second-NAT-translated UL data packet to the internal target AS through a network connected to the internal target AS. Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, the third NAT parameter may further include a third DL NAT parameter, and the AF may be further configured to generate the third DL NAT parameter according to the second DL NAT parameter. The configuring a third NAT parameter using an AF may further include: obtaining, by the M-B, the third DL NAT parameter from the AF. The performing NAT translation on the data packet according to the third NAT parameter may further include: transmitting, by the internal target AS, the DL data packet to the M-B; performing, by the M-B, third NAT translation on the DL data packet according to the third DL NAT parameter; and transmitting, by the M-B, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE. Because the DL IP data packet received by the UE and the DL data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

In an exemplary embodiment, the target AS may include first NAT M-W and an internal source AS. The configuring a third NAT parameter using an AF, and migrating from a source AS to the target AS may include: obtaining, by the first NAT M-W, the third UL NAT parameter from the AF; and copying an image of a running environment of the source AS to the internal source AS through the AF (causing a network address of the internal source AS to be the source AS IP address). The performing NAT translation on the data packet according to the third NAT parameter may include: receiving, by the first NAT M-W, a first-NAT-translated UL data packet from the target UPF/PSA; performing, by the first NAT M-W, second NAT translation on the first-NAT-translated UL data packet according to the third UL NAT parameter, to obtain a second-NAT-translated UL data packet; and transmitting, by the first NAT M-W, the second-NAT-translated UL data packet to the internal source AS. Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, the third NAT parameter may further include a third DL NAT parameter, and the AF is further configured to generate the third DL NAT parameter according to the second DL NAT parameter. The configuring a third NAT parameter using an AF may further include: obtaining, by the first NAT M-W, the third DL NAT parameter from the AF. The performing NAT translation on the data packet according to the third NAT parameter may further include: transmitting, by the internal source AS, the DL data packet to the first NAT M-W; performing, by the first NAT M-W, third NAT translation on the DL data packet according to the third DL NAT parameter; and transmitting, by the first NAT M-W, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE. Because the DL IP data packet received by the UE and the DL data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

In an exemplary embodiment, the target AS may include a target IP protocol stack and an internal source AS running application, and the target IP protocol stack may include second NAT M-W. The configuring a third NAT parameter using an AF, and migrating from a source AS to the target AS may include: obtaining, by the target IP protocol stack, the third UL NAT parameter from the AF; configuring, by the target IP protocol stack, the third UL NAT parameter for the second NAT M-W; and copying a running application of the source AS to the target AS through the AF to obtain the internal source AS running application, and using the internal source AS running application as a running application of the source AS (causing a network address of the target IP protocol stack to be the target AS IP address). The performing NAT translation on the data packet according to the third NAT parameter may include: receiving, by the target IP protocol stack, a first-NAT-translated UL data packet from the target UPF/PSA; performing, by the second NAT M-W, second NAT translation on the first-NAT-translated UL data packet according to the third UL NAT parameter, to obtain a UL data packet whose destination address is the source AS IP address; and transmitting, by the target IP protocol stack, the UL data packet whose destination address is the source AS IP address to the internal source AS running application. Because the UL IP data packet obtained by the (E)AS2 and the UL IP data packet obtained by (E)AS1 have the same source IP address, source port number, target IP address, and target port number in this case, data connection continuity of the UL IP packet may be implemented, thereby implementing continuity of the UL IP service.

In an exemplary embodiment, the data packet may further include a DL data packet, the second NAT parameter may further include a second DL NAT parameter, the third NAT parameter may further include a third DL NAT parameter, and the AF may be further configured to generate the third DL NAT parameter according to the second DL NAT parameter. The configuring a third NAT parameter using an AF may further include: obtaining, by the target IP protocol stack, the third DL NAT parameter from the AF; and configuring, by the target IP protocol stack, the third DL NAT parameter for the second NAT M-W. The performing NAT translation on the data packet according to the third NAT parameter may further include: transmitting, by the internal source AS running application, the DL data packet to the target IP protocol stack; performing, by the second NAT M-W, third NAT translation on the DL data packet according to the third DL NAT parameter; and transmitting, by the target IP protocol stack, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE. Because the DL IP data packet received by the UE and the DL data packet transmitted by the (E)AS1 have the same source IP address, source port number, target IP address, and target port number in this case, data connection continuity of the DL IP packet may be implemented, thereby implementing continuity of the DL IP service.

Moreover, because the UL and DL IP data packets can both implement data connection continuity of IP packets, thereby implementing continuity of UL and DL IP services, continuity of the entire IP service is ensured.

For the specific implementation of the method for implementing communication continuity provided in this embodiment of the present disclosure, reference may be made to the content in the method for implementing communication continuity in the foregoing other embodiments, and details are not described herein again.

Figure 12:
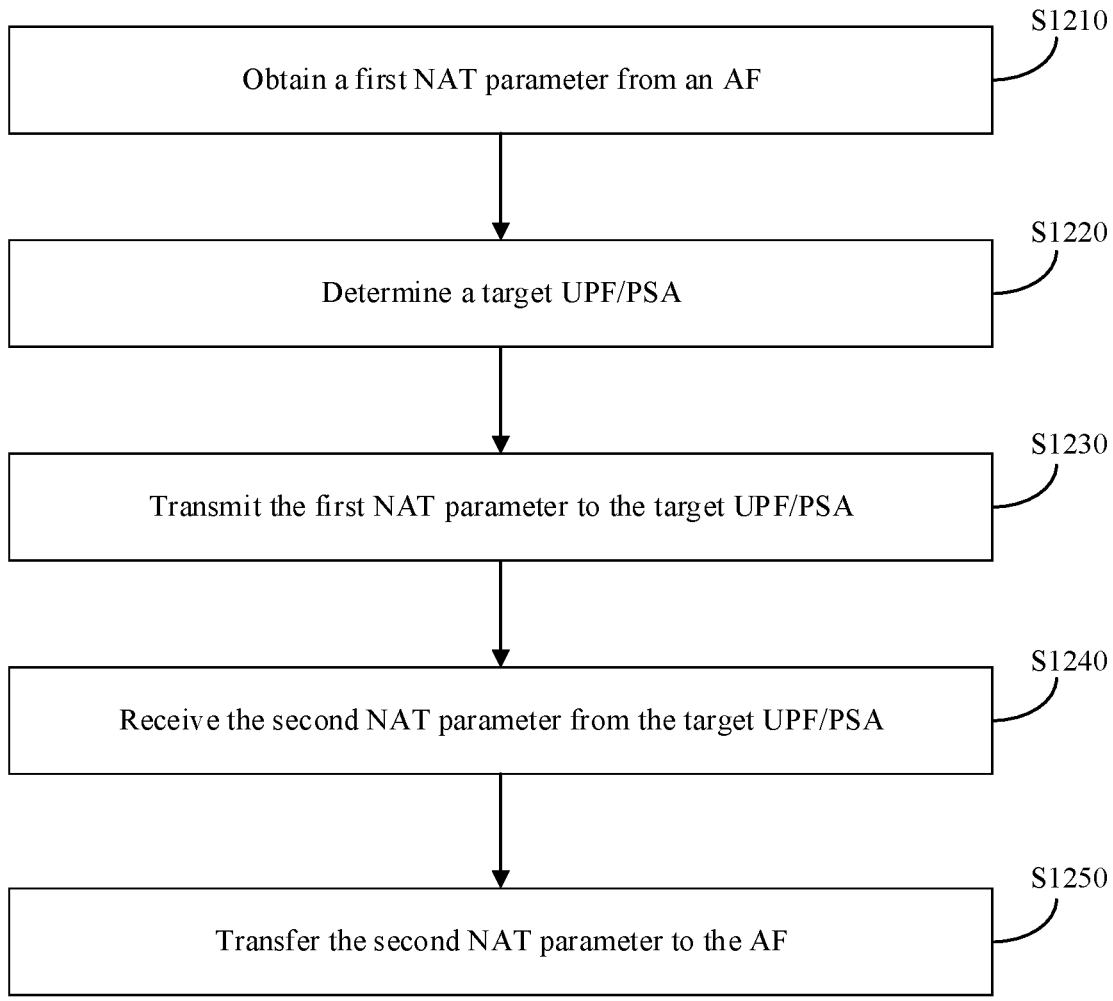
FIG. 12 is a schematic flowchart of a method for implementing communication continuity according to still another embodiment of the present disclosure.

FIG. 12 is a schematic flowchart of a method for implementing communication continuity according to still another embodiment of the present disclosure. The method provided in this embodiment in FIG. 12 is applicable to an SMF corresponding to UE, and the UE establishes a connection to a source AS using allocated UE source network address information. As shown in FIG. 12, the method provided in this embodiment of the present disclosure may include the following steps:

Step S1210: Obtain a first NAT parameter from an AF.

Step S1220: Determine a target UPF/PSA, so that the target UPF/PSA reallocates UE target network address information to the UE and causes the UE to continue to use the UE source network address information.

In an exemplary embodiment, the target UPF/PSA may be further configured to allocate CN tunnel information. After the determining a target UPF/PSA, the method may further include: obtaining the CN tunnel information from the target UPF/PSA; transmitting indication information to the target UPF/PSA, the indication information being used for indicating that in a case that the target UPF/PSA receives a UL data packet from the UE before receiving a data transmission notification transmitted by the SMF, the target UPF/PSA buffers the UL data packet; and selecting a target UL CL/BP, and configuring the CN tunnel information for the target UL CL/BP and a RAN.

Step S1230: Transmit the first NAT parameter to the target UPF/PSA, so that the target UPF/PSA generates a second NAT parameter according to the first NAT parameter, the UE target network address information, and the UE source network address information.

Step S1240: Receive the second NAT parameter from the target UPF/PSA, the target UPF/PSA being configured to perform NAT translation on a received data packet according to the second NAT parameter.

Step S1250: Transfer the second NAT parameter to the AF, so that the AF configures a third NAT parameter for a target AS according to the second NAT parameter and migrates from the source AS to the target AS, the target AS being configured to perform NAT translation on the data packet according to the third NAT parameter.

In an exemplary embodiment, after the transferring the second NAT parameter to the AF, the method may further include: transmitting the data transmission notification to the target UPF/PSA, to instruct the target UPF/PSA to receive, through the target UL CL/BP, the UL data packet transmitted by the UE or transmit a DL data packet to the UE through the target UL CL/BP.

For the specific implementation of the method for implementing communication continuity provided in this embodiment of the present disclosure, reference may be made to the content in the method for implementing communication continuity in the foregoing other embodiments, and details are not described herein again.

Figure 13:
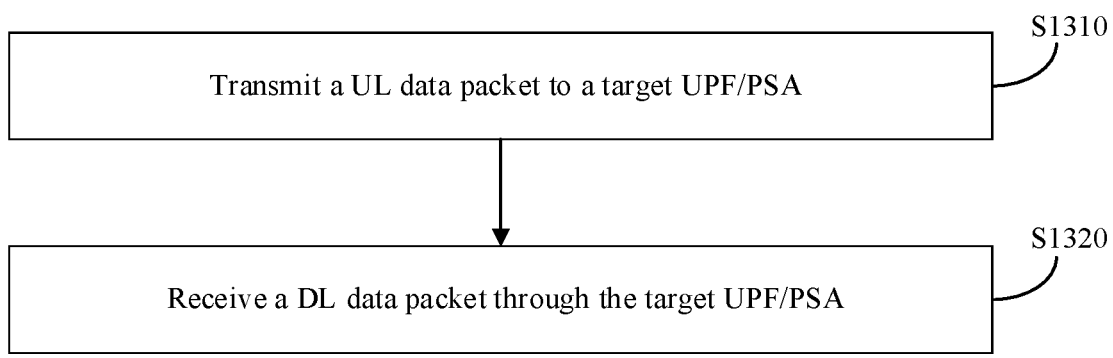
FIG. 13 is a schematic flowchart of a method for implementing communication continuity according to yet another embodiment of the present disclosure.

FIG. 13 is a schematic flowchart of a method for implementing communication continuity according to yet another embodiment of the present disclosure. The method provided in this embodiment in FIG. 13 is applicable to UE, and the UE establishes a connection to a source AS using allocated UE source network address information. As shown in FIG. 13, the method provided in this embodiment of the present disclosure may include the following steps:

Step S1310: Transmit a UL data packet to a target UPF/PSA, so that the target UPF/PSA performs first NAT translation on the UL data packet according to a second UL NAT parameter, generates a first-NAT-translated UL data packet, and transmits the first-NAT-translated UL data packet to a target AS, the target AS being configured to perform second NAT translation on the first-NAT-translated UL data packet according to a third UL NAT parameter.

Step S1320: Receive a DL data packet through the target UPF/PSA, the target AS being configured to perform third NAT translation on the DL data packet according to a third DL NAT parameter, and the target UPF/PSA being configured to perform fourth NAT translation on a third-NAT-translated DL data packet according to a second DL NAT parameter.

For the specific implementation of the method for implementing communication continuity provided in this embodiment of the present disclosure, reference may be made to the content in the method for implementing communication continuity in the foregoing other embodiments, and details are not described herein again.

Figure 14:
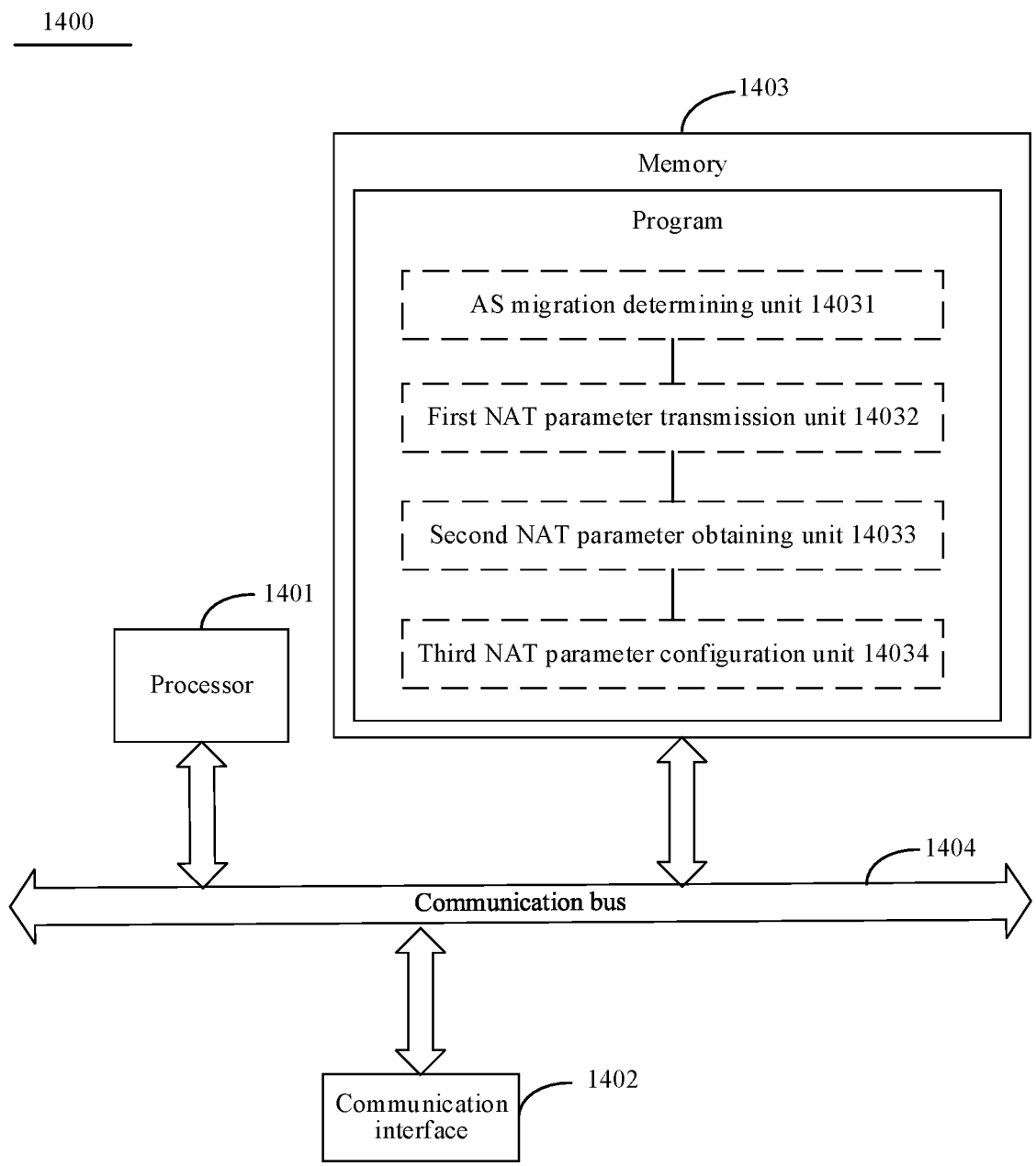
FIG. 14 is a schematic block diagram of an AF device according to an embodiment of the present disclosure.

FIG. 14 is a schematic block diagram of an AF device according to an embodiment of the present disclosure. As shown in FIG. 14, this embodiment of the present disclosure provides an AF device 1400, and the AF device 1400 may include: one or more processors 1401; and a memory 1403, configured to store one or more programs, the one or more programs, when executed by the one or more processors 1401, causing the one or more processors 1401 to implement the method according to any one of the foregoing embodiments.

UE corresponding to the AF device 1400 establishes a connection to a source AS using allocated UE source network address information.

The program may be specifically configured to: determine to migrate from the source AS to a target AS; transmit a first NAT parameter to an SMF, so that the SMF determines a target UPF/PSA, the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter; obtain the second NAT parameter from the SMF; and configure a third NAT parameter for the target AS according to the second NAT parameter, and migrate from the source AS to the target AS, so that the target AS performs NAT translation on the data packet according to the third NAT parameter.

With continued reference to FIG. 14, the program may include: an AS migration determining unit 14031, which may be configured to determine to migrate from the source AS to a target AS; a first NAT parameter transmission unit 14032, which may be configured to transmit a first NAT parameter to an SMF, so that the SMF determines a target UPF/PSA, the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter; and obtain the second NAT parameter from the SMF; and a second NAT parameter obtaining unit 14033, which may be configured to obtain the second NAT parameter from the SMF; and a third NAT parameter configuration unit 14034, which may be configured to configure a third NAT parameter for the target AS according to the second NAT parameter, and migrate from the source AS to the target AS, so that the target AS performs NAT translation on the data packet according to the third NAT parameter.

In an exemplary embodiment, the AS migration determining unit 14031 may be configured to: receive an event exposure early notification message from the SMF; and determine to migrate from the source AS to the target AS according to the event exposure early notification message.

In an exemplary embodiment, the AS migration determining unit 14031 may be configured to: receive a traffic influence early notification message from an NEF, where the NEF being configured to receive an event exposure early notification message from the SMF and transmit the traffic influence early notification message to the AF according to the event exposure early notification message.

In an exemplary embodiment, the first NAT parameter may include target AS network address information of the target AS, and the target AS network address information may include a target AS IP address and a target AS port number.

In an exemplary embodiment, the first NAT parameter transmission unit 14032 may be configured to: transmit an event exposure application relocation message to the SMF, the event exposure application relocation message carrying the target AS IP address and the target AS port number.

In an exemplary embodiment, the first NAT parameter transmission unit 14032 may be configured to: transmit a traffic influence application relocation information message to an NEF, the traffic influence application relocation information message carrying the target AS IP address and the target AS port number, so that the NEF transmits an event exposure application relocation message to the SMF, the event exposure application relocation message carrying the target AS IP address and the target AS port number.

In an exemplary embodiment, the first NAT parameter transmission unit 14032 may be configured to: transmit a policy authorization create/update request message to a PCF, the policy authorization create/update request message carrying the target AS IP address and the target AS port number of the target AS, so that the PCF transmits a session management policy control update notification message to the SMF, the session management policy control update notification message carrying the target AS IP address and the target AS port number of the target AS.

In an exemplary embodiment, the data packet may include a UL data packet transmitted by the UE, the second NAT parameter may include a second UL NAT parameter, the target UPF/PSA may be configured to perform first NAT translation on the UL data packet according to the second UL NAT parameter, the third NAT parameter may include a third UL NAT parameter, and source AS network address information of the source AS may include a source AS IP address. The configuring a third NAT parameter for the target AS according to the second NAT parameter may include: generating the third UL NAT parameter according to the second UL NAT parameter.

In an exemplary embodiment, the target AS may include an M-B and an internal target AS, the M-B and the internal target AS are different network entities and perform communication through a network connection, and a network address of the M-B is the target AS IP address. The third NAT parameter configuration unit 14034 may be configured to: configure the third UL NAT parameter for the M-B, so that the M-B performs second NAT translation on a first-NAT-translated UL data packet according to the third UL NAT parameter, to obtain a second-NAT-translated UL data packet, and transmits the second-NAT-translated UL data packet to the internal target AS through a network connected to the internal target AS; and use a source AS IP address of the source AS as a network address of the internal target AS, so that the internal target AS receives the second-NAT-translated UL data packet from the M-B through the network connected to the M-B.

In an exemplary embodiment, the data packet may further include a DL data packet, the second NAT parameter may further include a second DL NAT parameter, and the third NAT parameter may further include a third DL NAT parameter. The third NAT parameter configuration unit 14034 may be further configured to: generate the third DL NAT parameter according to the second DL NAT parameter; and configure the third DL NAT parameter for the M-B, so that the M-B performs, according to the third DL NAT parameter, third NAT translation on a DL data packet transmitted by the internal target AS, and transmits the third-NAT-translated DL data packet to the target UPF/PSA, and the target UPF/PSA is further configured to perform fourth NAT translation on the third-NAT-translated DL data packet according to the second DL NAT parameter, to obtain the fourth-NAT-translated DL data packet, and transmit the fourth-NAT-translated DL data packet to the UE.

In an exemplary embodiment, the target AS may include first NAT M-W and an internal source AS. The third NAT parameter configuration unit 14034 may be configured to: configure the third UL NAT parameter for the first NAT M-W, so that the first NAT M-W performs second NAT translation on a first-NAT-translated UL data packet according to the third UL NAT parameter, to obtain a second-NAT-translated UL data packet, and transmits the second-NAT-translated UL data packet to the internal source AS; and copy an image of a running environment of the source AS to the internal source AS (causing a network address of the internal source AS to be the source AS IP address), so that the internal source AS receives the second-NAT-translated UL data packet through the first NAT M-W.

In an exemplary embodiment, the data packet may further include a DL data packet, the second NAT parameter may further include a second DL NAT parameter, and the third NAT parameter may further include a third DL NAT parameter. The third NAT parameter configuration unit 14034 may be further configured to: generate the third DL NAT parameter according to the second DL NAT parameter; and configure the third DL NAT parameter for the first NAT M-W, so that the first NAT M-W performs, according to the third DL NAT parameter, third NAT translation on a DL data packet transmitted by the internal source AS, and transmits the third-NAT-translated DL data packet to the target UPF/PSA, and the target UPF/PSA is further configured to perform fourth NAT translation on the third-NAT-translated DL data packet according to the second DL NAT parameter, to obtain the fourth-NAT-translated DL data packet, and transmit the fourth-NAT-translated DL data packet to the UE.

In an exemplary embodiment, the target AS may include a target IP protocol stack and an internal source AS running application, and the target IP protocol stack includes second NAT M-W. The third NAT parameter configuration unit 14034 may be configured to: transmit the third UL NAT parameter to the target IP protocol stack, so that the third UL NAT parameter is configured for the second NAT M-W, and the second NAT M-W performs second NAT translation on a first-NAT-translated UL data packet according to the third UL NAT parameter, to obtain a UL data packet whose destination address is the source AS IP address; and copy a running application of the source AS to the target AS to obtain the internal source AS running application, and use the internal source AS running application as a running application of the source AS (causing a network address of the target IP protocol stack to be the target AS IP address), so that the internal source AS running application receives, from the target IP protocol stack, the UL data packet whose destination address is the source AS IP address.

In an exemplary embodiment, the data packet may further include a DL data packet, the second NAT parameter may further include a second DL NAT parameter, and the third NAT parameter may further include a third DL NAT parameter. The third NAT parameter configuration unit 14034 may be further configured to: generate the third DL NAT parameter according to the second DL NAT parameter; and transmit the third DL NAT parameter to the target IP protocol stack, so that the third DL NAT parameter is configured for the second NAT M-W, and the second NAT M-W performs, according to the third DL NAT parameter, third NAT translation on a DL data packet transmitted by the internal source AS running application, and transmits the third-NAT-translated DL data packet to the target UPF/PSA, and the target UPF/PSA is further configured to perform fourth NAT translation on the third-NAT-translated DL data packet according to the second DL NAT parameter, to obtain the fourth-NAT-translated DL data packet, and transmit the fourth-NAT-translated DL data packet to the UE.

In an exemplary embodiment, the UE source network address information may include a UE source IP address and a source UE port number, the UE target network address information may include a UE target IP address and a target UE port number, and the source AS network address information may further include a source AS port number. The second UL NAT parameter may be used for indicating that the target UPF/PSA translates a source address of the UL data packet from the UE source IP address into the UE target IP address and translates a destination address of the UL data packet from the source AS IP address into the target AS IP address; and the third UL NAT parameter may be used for indicating that the target AS translates a source address of a first-NAT-translated UL data packet from the UE target IP address into the UE source IP address and translates a destination address of the first-NAT-translated UL data packet from the target AS IP address into the source AS IP address; or the second UL NAT parameter may be used for indicating that the target UPF/PSA translates a source address of the UL data packet from the UE source IP address into the UE target IP address, translates a destination address of the UL data packet from the source AS IP address into the target AS IP address, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a destination address of the first-NAT-translated UL data packet from the target AS IP address into the source AS IP address, and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address, translates a destination address of the UL data packet from the source AS IP address into the target AS IP address, and translates a source port of the UL data packet from the source UE port number into the target UE port number; and the third UL NAT parameter may be used for indicating that the target AS translates a source address of a first-NAT-translated UL data packet from the UE target IP address into the UE source IP address, translates a destination address of the first-NAT-translated UL data packet from the target AS IP address into the source AS IP address, and translates a source port of the first-NAT-translated UL data packet from the target UE port number into the source UE port number; or the second UL NAT parameter may be used for indicating that the target UPF/PSA translates a source address of the UL data packet from the UE source IP address into the UE target IP address, translates a destination address of the UL data packet from the source AS IP address into the target AS IP address, translates a source port of the UL data packet from the source UE port number into the target UE port number, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a destina- tion address of the first-NAT-translated UL data packet from the target AS IP address into the source AS IP address, translates a source port of the first-NAT-translated UL data packet from the target UE port number into the source UE port number, and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address and translates a target port of the UL data packet from the source AS port number into the target AS port number; and the third UL NAT parameter may be used for indicating that the target AS translates a source address of a first-NAT-translated UL data packet from the UE target IP address into the UE source IP address and translates a target port of the first-NAT-translated UL data packet from the target AS port number into the source AS port number; or the second UL NAT parameter may be used for indicating that the target UPF/PSA translates a source address of the UL data packet from the UE source IP address into the UE target IP address, translates a source port of the UL data packet from the source UE port number into the target UE port number, and translates a target port of the UL data packet from the source AS port number into the target AS port number; and the third UL NAT parameter may be used for indicating that the target AS translates a source address of a first-NAT-translated UL data packet from the UE target IP address into the UE source IP address, translates a source port of the first-NAT-translated UL data packet from the target UE port number into the source UE port number, and translates a target port of the first-NAT-translated UL data packet from the target AS port number into the source AS port number.

In an exemplary embodiment, the UE source network address information may include a UE source IP address and a source UE port number, the UE target network address information may include a UE target IP address and a target UE port number, and the source AS network address information may further include a source AS port number. The third DL NAT parameter may be used for indicating that the target AS translates a source address of the DL data packet from the source AS IP address into the target AS IP address and translates a destination address of the DL data packet from the UE source IP address into the UE target IP address; and the second DL NAT parameter may be used for indicating that the target UPF/PSA translates a source address of the third-NAT-translated DL data packet from the target AS IP address into the source AS IP address and translates a destination address of the third-NAT-translated DL data packet from the UE target IP address into the UE source IP address; or the third DL NAT parameter may be used for indicating that the target AS translates a source address of the DL data packet from the source AS IP address into the target AS IP address, translates a destination address of the DL data packet from the UE source IP address into the UE target IP address, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, and translates a target port of the third-NAT-translated DL data packet from the target UE port number into the source UE port number; or the third DL NAT parameter may be used for indicating that the target AS translates a source address of the DL data packet from the source AS IP address into the target AS IP address, translates a destination address of the DL data packet from the UE source IP address into the UE target IP address, and translates a source port of the DL data packet from a source AS port number of the source AS into a target AS port number of the target AS; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, and translates a source port of the third-NAT-translated DL data packet from the target AS port number into the source AS port number; or the third DL NAT parameter may be used for indicating that the target AS translates a source address of the DL data packet from the source AS IP address into the target AS IP address, translates a destination address of the DL data packet from the UE source IP address into the UE target IP address, translates a source port of the DL data packet from a source AS port number of the source AS into a target AS port number of the target AS, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a destination address of the third-NAT-translated DL data packet from the UE target IP address into the UE source IP address, translates a source port of the third-NAT-translated DL data packet from the target AS port number into the source AS port number, and translates a target port of the third-NAT-translated DL data packet from the target UE port number into the source UE port number; or the third DL NAT parameter may be used for indicating that the target AS translates a source address of the DL data packet from the source AS IP address into the target AS IP address and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address and translates a target port of the third-NAT-translated DL data packet from the target UE port number into the source UE port number; or the third DL NAT parameter may be used for indicating that the target AS translates a source address of the DL data packet from the source AS IP address into the target AS IP address, translates a source port of the DL data packet from a source AS port number of the source AS into a target AS port number of the target AS, and translates a target port of the DL data packet from the source UE port number into the target UE port number; and the second DL NAT parameter may be used for indicating that the target UPF/PSA translates a source address of the third-NAT-translated DL data packet from the target AS IP address into the source AS IP address, translates a source port of the third-NAT-translated DL data packet from the target AS port number into the source AS port number, and translates a target port of the third-NAT-translated DL data packet from the target UE port number into the source UE port number.

For the specific implementation of each unit in the AF device provided in this embodiment of the present disclosure, reference may be made to the content in the foregoing method for implementing communication continuity, and details are not described herein again.

Figure 15:
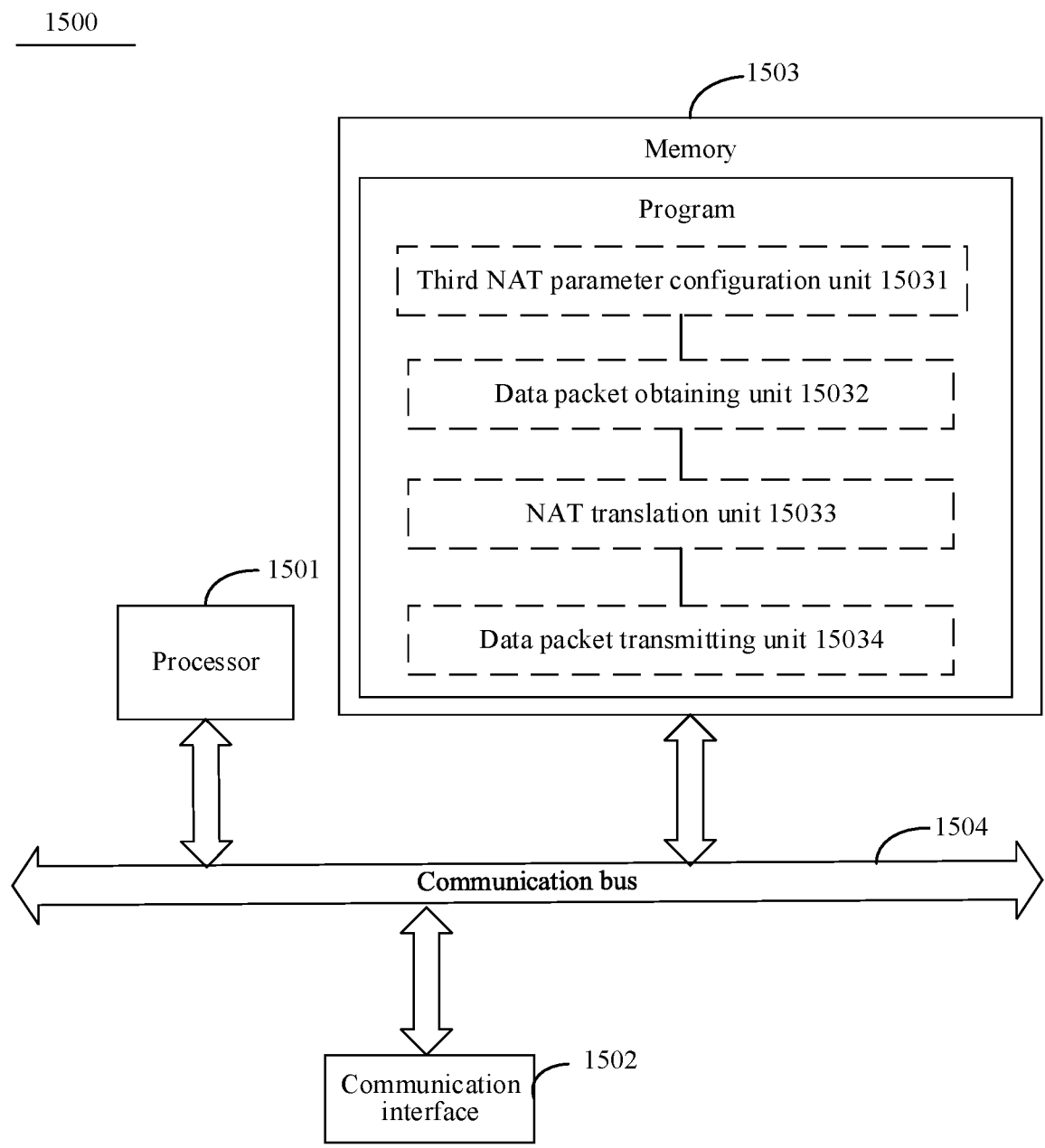
FIG. 15 is a schematic block diagram of a target AS according to an embodiment of the present disclosure.

FIG. 15 is a schematic block diagram of a target AS according to an embodiment of the present disclosure. As shown in FIG. 15, the target AS 1500 may include: one or more processors 1501; and a memory 1503, configured to store one or more programs, the one or more programs, when executed by the one or more processors 1501, causing the one or more processors 1501 to implement the method according to any one of the foregoing embodiments.

The program may be specifically configured to: configure a third NAT parameter using an AF, and migrate from a source AS to the target AS, the third NAT parameter being generated according to a second NAT parameter of a target UPF/PSA; obtain a data packet, the data packet being a data packet generated after the target UPF/PSA performs NAT translation according to the second NAT parameter or a data packet generated by the target AS; perform NAT translation on the data packet according to the third NAT parameter; and transmit, in a case that the data packet is a data packet generated by the target AS, a data packet generated after performing NAT translation according to the third NAT parameter to the target UPF/PSA, so that the target UPF/PSA performs NAT translation again according to the second NAT parameter.

With continued reference to FIG. 15, the program may further include: a third NAT parameter configuration unit 15031, which may be configured to configure a third NAT parameter using an AF, and migrate from a source AS to the target AS, the third NAT parameter being generated according to a second NAT parameter of a target UPF/PSA; a data packet obtaining unit 15032, which may be configured to obtain a data packet, the data packet being a data packet generated after the target UPF/PSA performs NAT translation according to the second NAT parameter or a data packet generated by the target AS; an NAT translation unit 15033, which may be configured to perform NAT translation on the data packet according to the third NAT parameter; and a data packet transmitting unit 15034, which may be configured to: transmit, in a case that the data packet is a data packet generated by the target AS, a data packet generated after performing NAT translation according to the third NAT parameter to the target UPF/PSA, so that the target UPF/PSA performs NAT translation again according to the second NAT parameter.

In an exemplary embodiment, the data packet may include a UL data packet transmitted by the UE, the second NAT parameter may include a second UL NAT parameter, the target UPF/PSA may be configured to perform first NAT translation on the UL data packet according to the second UL NAT parameter, the third NAT parameter may include a third UL NAT parameter, source AS network address information of the source AS may include a source AS IP address, and the AF may be configured to generate the third UL NAT parameter according to the second UL NAT parameter.

In an exemplary embodiment, the target AS may include an M-B and an internal target AS. The M-B and the internal target AS are different network entities, and perform communication through a network connection. A network address of the M-B is a target AS IP address of the target AS. The third NAT parameter configuration unit 15031 may be configured to: obtain, by the M-B, the third UL NAT parameter from the AF; and use the source AS IP address of the source AS as a network address of the internal target AS through the AF. The NAT translation unit 15033 may be configured to: receive, by the M-B, a first-NAT-translated UL data packet from the target UPF/PSA; perform, by the M-B, second NAT translation on the first-NAT-translated UL data packet according to the third UL NAT parameter, to obtain a second-NAT-translated UL data packet; and transmit, by the M-B, the second-NAT-translated UL data packet to the internal target AS through a network connected to the internal target AS.

In an exemplary embodiment, the data packet may further include a DL data packet, the second NAT parameter may further include a second DL NAT parameter, the third NAT parameter may further include a third DL NAT parameter, and the AF may be further configured to generate the third DL NAT parameter according to the second DL NAT parameter. The third NAT parameter configuration unit 15031 may be further configured to: obtain, by the M-B, the third DL NAT parameter from the AF. The NAT translation unit 15033 may be further configured to: transmit, by the internal target AS, the DL data packet to the M-B; perform, by the M-B, third NAT translation on the DL data packet according to the third DL NAT parameter; and transmit, by the M-B, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE.

In an exemplary embodiment, the target AS may include first NAT M-W and an internal source AS. The third NAT parameter configuration unit 15031 may be configured to: obtain, by the first NAT M-W, the third UL NAT parameter from the AF; and copy an image of a running environment of the source AS to the internal source AS through the AF (causing a network address of the internal source AS to be the source AS IP address). The NAT translation unit 15033 may be configured to: receive, by the first NAT M-W, a first-NAT-translated UL data packet from the target UPF/PSA; perform, by the first NAT M-W, second NAT translation on the first-NAT-translated UL data packet according to the third UL NAT parameter, to obtain a second-NAT-translated UL data packet; and transmit, by the first NAT M-W, the second-NAT-translated UL data packet to the internal source AS.

The data packet further includes a DL data packet, the second NAT parameter further includes a second DL NAT parameter, the third NAT parameter further includes a third DL NAT parameter, and the AF is further configured to generate the third DL NAT parameter according to the second DL NAT parameter. The third NAT parameter configuration unit 15031 may be further configured to: obtain, by the first NAT M-W, the third DL NAT parameter from the AF. The NAT translation unit 15033 may be further configured to: transmit, by the internal source AS, the DL data packet to the first NAT M-W; perform, by the first NAT M-W, third NAT translation on the DL data packet according to the third DL NAT parameter; and transmit, by the first NAT M-W, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE.

In an exemplary embodiment, the target AS may include a target IP protocol stack and an internal source AS running application, and the target IP protocol stack includes second NAT M-W. The third NAT parameter configuration unit 15031 may be configured to: obtain, by the target IP protocol stack, the third UL NAT parameter from the AF; configure, by the target IP protocol stack, the third UL NAT parameter for the second NAT M-W; and copy a running application of the source AS to the target AS through the AF to obtain the internal source AS running application, and using the internal source AS running application as a running application of the source AS (causing a network address of the target IP protocol stack to be the target AS IP address). The NAT translation unit 15033 may be configured to: receive, by the target IP protocol stack, a first-NAT-translated UL data packet from the target UPF/PSA; perform, by the second NAT M-W, second NAT translation on the first-NAT-translated UL data packet according to the third UL NAT parameter, to obtain a UL data packet whose destination address is the source AS IP address; and transmit, by the target IP protocol stack, the UL data packet whose destination address is the source AS IP address to the internal source AS running application.

In an exemplary embodiment, the data packet may further include a DL data packet, the second NAT parameter may further include a second DL NAT parameter, the third NAT parameter may further include a third DL NAT parameter, and the AF may be further configured to generate the third DL NAT parameter according to the second DL NAT parameter. The third NAT parameter configuration unit 15031 may be further configured to: obtain, by the target IP protocol stack, the third DL NAT parameter from the AF; and configure, by the target IP protocol stack, the third DL NAT parameter for the second NAT M-W. The NAT translation unit 15033 may be further configured to: transmit, by the internal source AS running application, the DL data packet to the target IP protocol stack; perform, by the second NAT M-W, third NAT translation on the DL data packet according to the third DL NAT parameter; and transmit, by the target IP protocol stack, a third-NAT-translated DL data packet to the target UPF/PSA, so that the target UPF/PSA performs fourth NAT translation on the third-NAT-translated DL data packet according to the second DL NAT parameter, to obtain a fourth-NAT-translated DL data packet, and transmits the fourth-NAT-translated DL data packet to the UE.

For the specific implementation of each unit in the target AS provided in this embodiment of the present disclosure, reference may be made to the content in the foregoing method for implementing communication continuity, and details are not described herein again.

Figure 16:
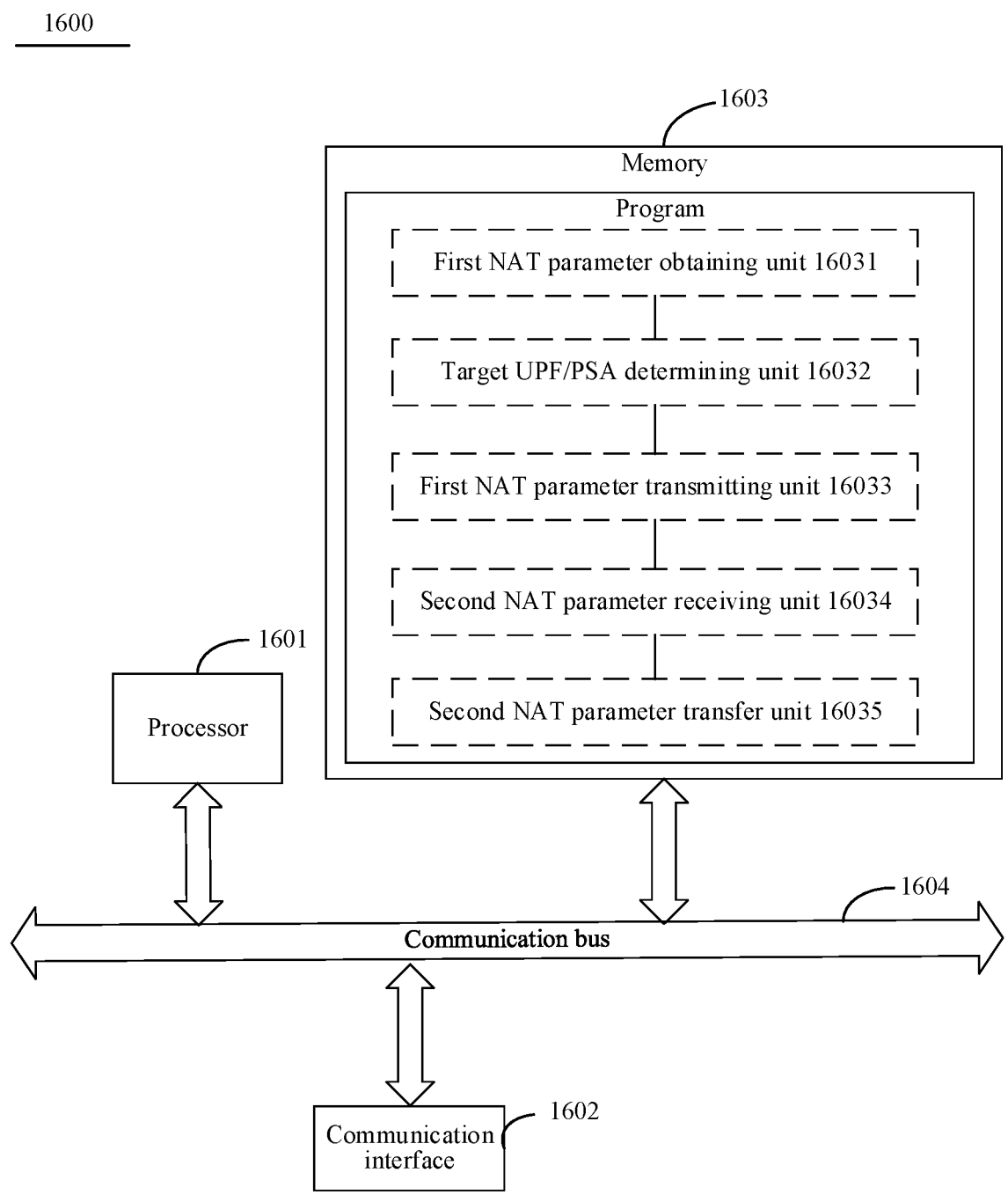
FIG. 16 is a schematic block diagram of an SMF device according to an embodiment of the present disclosure.

FIG. 16 is a schematic block diagram of an SMF device according to an embodiment of the present disclosure. As shown in FIG. 16, the SMF device 1600 may include: one or more processors 1601; and a memory 1603, configured to store one or more programs, the one or more programs, when executed by the one or more processors 1601, causing the one or more processors 1601 to implement the method according to any one of the foregoing embodiments.

UE corresponding to the SMF device 1600 establishes a connection to a source AS using allocated UE source network address information.

The program may be specifically configured to: obtain a first NAT parameter from an AF; determine a target UPF/PSA, so that the target UPF/PSA reallocates UE target network address information to the UE and causes the UE to continue to use the UE source network address information; transmit the first NAT parameter to the target UPF/PSA, so that the target UPF/PSA generates a second NAT parameter according to the first NAT parameter, the UE target network address information, and the UE source network address information; receive the second NAT parameter from the target UPF/PSA, the target UPF/PSA being configured to perform NAT translation on a received data packet according to the second NAT parameter; and transfer the second NAT parameter to the AF, so that the AF configures a third NAT parameter for a target AS according to the second NAT parameter and migrates from the source AS to the target AS, the target AS being configured to perform NAT translation on the data packet according to the third NAT parameter.

With continued reference to FIG. 16, the program may further include: a first NAT parameter obtaining unit 16031, which may be configured to obtain a first NAT parameter from an AF; a target UPF/PSA determining unit 16032, which may be configured to determine a target UPF/PSA, so that the target UPF/PSA reallocates UE target network address information to the UE and causes the UE to continue to use the UE source network address information; a first NAT parameter transmitting unit 16033, which may be configured to transmit the first NAT parameter to the target UPF/PSA, so that the target UPF/PSA generates a second NAT parameter according to the first NAT parameter, the UE target network address information, and the UE source network address information; a second NAT parameter receiving unit 16034, which may be configured to receive the second NAT parameter from the target UPF/PSA, the target UPF/PSA being configured to perform NAT translation on a received data packet according to the second NAT parameter; and a second NAT parameter transfer unit 16035, which may be configured to transfer the second NAT parameter to the AF, so that the AF configures a third NAT parameter for a target AS according to the second NAT parameter and migrates from the source AS to the target AS, the target AS being configured to perform NAT translation on the data packet according to the third NAT parameter.

In an exemplary embodiment, the target UPF/PSA may be further configured to allocate CN tunnel information. The program may further include: a CN tunnel information obtaining unit, which may be configured to obtain the CN tunnel information from the target UPF/PSA after the target UPF/PSA is determined; an indication information transmitting unit, which may be configured to transmit indication information to the target UPF/PSA, the indication information being used for indicating that in a case that the target UPF/PSA receives a UL data packet from the UE before receiving a data transmission notification transmitted by the SMF, the target UPF/PSA buffers the UL data packet; and a UL CL selecting unit, which may be configured to select a target UL CL/BP, and configure the CN tunnel information for the target UL CL/BP and a RAN.

In an exemplary embodiment, the program may further include: a data transmission notification transmitting unit, which may be configured to: transmit the data transmission notification to the target UPF/PSA after the second NAT parameter is transferred to the AF, to instruct the target UPF/PSA to receive, through the target UL CL/BP, the UL data packet transmitted by the UE or transmit a DL data packet to the UE through the target UL CL/BP.

For the specific implementation of each unit in the SMF device provided in this embodiment of the present disclosure, reference may be made to the content in the foregoing method for implementing communication continuity, and details are not described herein again.

Figure 17:
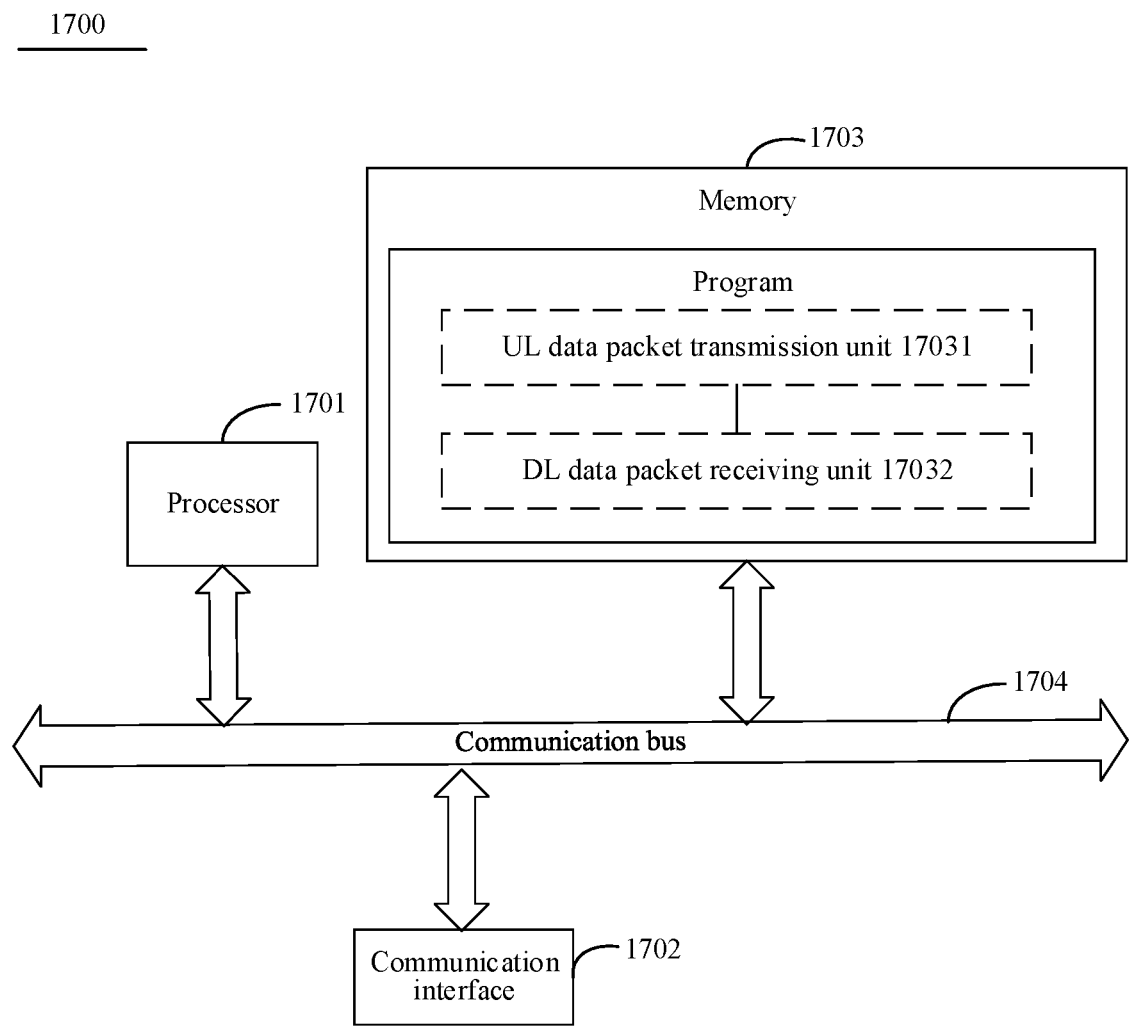
FIG. 17 is a schematic block diagram of UE according to an embodiment of the present disclosure.

FIG. 17 is a schematic block diagram of UE according to an embodiment of the present disclosure. As shown in FIG. 17, the UE 1700 may include: one or more processors 1701; and a memory 1703, configured to store one or more programs, the one or more programs, when executed by the one or more processors 1701, causing the one or more processors 1701 to implement the method according to any one of the foregoing embodiments. The UE establishes a connection to a source AS using allocated UE source network address information.

The program may be specifically configured to: transmit a UL data packet to a target UPF/PSA, so that the target UPF/PSA performs first NAT translation on the UL data packet according to a second UL NAT parameter, generates a first-NAT-translated UL data packet, and transmits the first-NAT-translated UL data packet to a target AS, the target AS being configured to perform second NAT translation on the first-NAT-translated UL data packet according to a third UL NAT parameter; and receive a DL data packet through the target UPF/PSA, the target AS being configured to perform third NAT translation on the DL data packet according to a third DL NAT parameter, and the target UPF/PSA being configured to perform fourth NAT translation on a third-NAT-translated DL data packet according to a second DL NAT parameter.

With reference to FIG. 17, the program may further include: a UL data packet transmission unit 17031, which may be configured to transmit a UL data packet to a target UPF/PSA, so that the target UPF/PSA performs first NAT translation on the UL data packet according to a second UL NAT parameter, generates a first-NAT-translated UL data packet, and transmits the first-NAT-translated UL data packet to a target AS, the target AS being configured to perform second NAT translation on the first-NAT-translated UL data packet according to a third UL NAT parameter; and a DL data packet receiving unit 17032, which may be configured to receive a DL data packet through the target UPF/PSA, the target AS being configured to perform third NAT translation on the DL data packet according to a third DL NAT parameter, and the target UPF/PSA being configured to perform fourth NAT translation on a third-NAT-translated DL data packet according to a second DL NAT parameter.

For the specific implementation of each unit in the UE provided in this embodiment of the present disclosure, reference may be made to the content in the foregoing method for implementing communication continuity, and details are not described herein again.

The foregoing FIG. 14, FIG. 15, FIG. 16 and FIG. 17 show schematic structural diagrams of the AF device 1400, the target AS 1500, the SMF device 1600 and the UE 1700 configured to implement embodiments of this application. The structures shown in FIG. 14, FIG. 15, FIG. 16 and FIG. 17 are merely examples, and are not to impose any limitation on a function and use scope of the embodiments of this application.

With reference to FIG. 14, FIG. 15, FIG. 16 and FIG. 17, the AF device 1400, the target AS 1500, the SMF device 1600 and the UE 1700 provided in the embodiments of the present disclosure may further respectively include: communication interfaces (1402, 1502, 1602, and 1702) and communication buses (1404, 1504, 1604, and 1704).

The processors (1401, 1501, 1601, and 1701), the communication interfaces (1402, 1502, 1602, and 1702) and the memories (1403, 1503, 1603, and 1703) complete communication between each other through the communication buses (1404, 1504, 1604, and 1704).

The communication interface (1404, 1504, 1604, or 1704) may be an interface of a communication module, for example, an interface of a Global System for Mobile communications (GSM) module. The processor 1301 is configured to execute a program. The memory (1403, 1503, 1603, or 1703) is configured to store the program. The program may include a computer program, and the computer program includes computer operation instructions.

The processor (1401, 1501, 1601, or 1701) may be a central processing unit (CPU), or an application-specific integrated circuit (ASIC), or one or more integrated circuits configured to implement this embodiment of the present disclosure.

The memory (1403, 1503, 1603, or 1703) may include a high-speed random access memory (RAM), and may also include a non-volatile memory, for example, at least one magnetic disk storage device.

Although a plurality of units of a device configured to perform actions are discussed in the foregoing detailed description, such division is not mandatory. In fact, according to the implementations of the present disclosure, features and functions of two or more units described above may be specified in one unit. On the contrary, the features or functions of one unit described above may further be divided and specified by a plurality of units.

Through the description of the foregoing embodiments, a person skilled in the art can easily understand that the exemplary implementations described herein may be implemented by software, or may be implemented by combining software with necessary hardware. Therefore, the technical solutions of the embodiments of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of the present disclosure.

A person skilled in the art can easily figure out another implementation solution of the present disclosure after considering the specification and practicing the present disclosure that is disclosed herein. This application is intended to cover any variation, use, or adaptive change of the present disclosure. These variations, uses, or adaptive changes follow the general principles of the present disclosure and include common general knowledge or common technical means in the art that are not disclosed in the present disclosure. The specification and the embodiments are considered as merely exemplary, and the scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A method for implementing communication continuity performed by a computer device acting as an application function (AF) device corresponding to user equipment (UE), the UE establishing a wireless connection to a source application server (AS) using allocated UE source network address information, the method comprising:

determining a data service migration from the source AS to a target AS;

transmitting a first network address translation (NAT) parameter to a session management function (SMF), wherein the SMF determines a target user plane function (UPF)/protocol data unit (PDU) session anchor (PSA), and the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter;

obtaining the second NAT parameter from the SMF; and configuring a third NAT parameter for the target AS according to the second NAT parameter, and migrating the data service from the source AS to the target AS, wherein the target AS performs NAT translation on the data packet according to the third NAT parameter.

2. The method according to claim 1, wherein the determining a data service migration from the source AS to a target AS comprises:

receiving an event exposure early notification message from the SMF; and determining to migrate the data service from the source AS to the target AS according to the event exposure early notification message.

3. The method according to claim 1, wherein the determining a data service migration from the source AS to a target AS comprises:

receiving a traffic influence early notification message from a network exposure function (NEF), wherein the NEF being configured to receive an event exposure early notification message from the SMF and transmit the traffic influence early notification message to the AF according to the event exposure early notification message.

4. The method according to claim 1, wherein the first NAT parameter comprises target AS network address information of the target AS, and the target AS network address information comprises a target AS IP address and a target AS port number, wherein the transmitting a first NAT parameter to an SMF comprises:

transmitting a traffic influence application relocation information message to an NEF, the traffic influence application relocation information message carrying the target AS IP address and the target AS port number, so that the NEF transmits an event exposure application relocation message to the SMF, the event exposure application relocation message carrying the target AS IP address and the target AS port number.

5. The method according to claim 1, wherein the first NAT parameter comprises target AS network address information of the target AS, and the target AS network address information comprises a target AS IP address and a target AS port number, wherein the transmitting a first NAT parameter to an SMF comprises:

transmitting a policy authorization create/update request message to a policy control function (PCF), the policy authorization create/update request message carrying the target AS IP address and the target AS port number, so that the PCF transmits a session management policy control update notification message to the SMF, the session management policy control update notification message carrying the target AS IP address and the target AS port number.

6. The method according to claim 1, wherein the first NAT parameter comprises target AS network address information of the target AS, and the target AS network address information comprises a target AS Internet Protocol (IP) address and a target AS port number, wherein the transmitting a first NAT parameter to an SMF comprises:

transmitting an event exposure application relocation message to the SMF, the event exposure application relocation message carrying the target AS IP address and the target AS port number.

7. The method according to claim 6, wherein the data packet comprises an uplink (UL) data packet transmitted by the UE, the second NAT parameter comprises a second UL NAT parameter, the target UPF/PSA is configured to perform first NAT translation on the UL data packet according to the second UL NAT parameter, the third NAT parameter comprises a third UL NAT parameter, and source AS network address information of the source AS comprises a source AS IP address, wherein the configuring a third NAT parameter for the target AS according to the second NAT parameter comprises:

generating the third UL NAT parameter according to the second UL NAT parameter.

8. A computer device acting as an application function (AF) device corresponding to user equipment (UE), the UE establishing a wireless connection to a source application server (AS) using allocated UE source network address information, the computer device comprising:

one or more processors; and a memory, configured to store one or more programs, the one or more programs, when executed by the one or more processors, causing the AF device to implement a method for implementing communication continuity, the method including:

determining a data service migration from the source AS to a target AS;

transmitting a first network address translation (NAT) parameter to a session management function (SMF), wherein the SMF determines a target user plane function (UPF)/protocol data unit (PDU) session anchor (PSA), and the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter;

obtaining the second NAT parameter from the SMF; and configuring a third NAT parameter for the target AS according to the second NAT parameter, and migrating the data service from the source AS to the target AS, wherein the target AS performs NAT translation on the data packet according to the third NAT parameter.

9. The computer device according to claim 8, wherein the determining a data service migration from the source AS to a target AS comprises:

receiving an event exposure early notification message from the SMF; and determining to migrate the data service from the source AS to the target AS according to the event exposure early notification message.

10. The computer device according to claim 8, wherein the determining a data service migration from the source AS to a target AS comprises:

receiving a traffic influence early notification message from a network exposure function (NEF), wherein the NEF being configured to receive an event exposure early notification message from the SMF and transmit the traffic influence early notification message to the AF according to the event exposure early notification message.

11. The computer device according to claim 8, wherein the first NAT parameter comprises target AS network address information of the target AS, and the target AS network address information comprises a target AS IP address and a target AS port number, wherein the transmitting a first NAT parameter to an SMF comprises:

transmitting a traffic influence application relocation information message to an NEF, the traffic influence application relocation information message carrying the target AS IP address and the target AS port number, so that the NEF transmits an event exposure application relocation message to the SMF, the event exposure application relocation message carrying the target AS IP address and the target AS port number.

12. The computer device according to claim 8, wherein the first NAT parameter comprises target AS network address information of the target AS, and the target AS network address information comprises a target AS IP address and a target AS port number, wherein the transmitting a first NAT parameter to an SMF comprises:
transmitting a policy authorization create/update request message to a policy control function (PCF), the policy authorization create/update request message carrying the target AS IP address and the target AS port number, so that the PCF transmits a session management policy control update notification message to the SMF, the session management policy control update notification message carrying the target AS IP address and the target AS port number.

13. The computer device according to claim 8, wherein the first NAT parameter comprises target AS network address information of the target AS, and the target AS network address information comprises a target AS Internet Protocol (IP) address and a target AS port number, wherein the transmitting a first NAT parameter to an SMF comprises:
transmitting an event exposure application relocation message to the SMF, the event exposure application relocation message carrying the target AS IP address and the target AS port number.

14. The computer device according to claim 13, wherein the data packet comprises an uplink (UL) data packet transmitted by the UE, the second NAT parameter comprises a second UL NAT parameter, the target UPF/PSA is configured to perform first NAT translation on the UL data packet according to the second UL NAT parameter, the third NAT parameter comprises a third UL NAT parameter, and source AS network address information of the source AS comprises a source AS IP address, wherein
the configuring a third NAT parameter for the target AS according to the second NAT parameter comprises:
generating the third UL NAT parameter according to the second UL NAT parameter.

15. A non-transitory computer-readable storage medium, storing a computer program, the computer program, when executed by a processor of computer device acting as an application function (AF) device corresponding to user equipment (UE), the UE establishing a wireless connection to a source application server (AS) using allocated UE source network address information, causing the computer device to implement a method for implementing communication continuity, the method including:
determining a data service migration from the source AS to a target AS;
transmitting a first network address translation (NAT) parameter to a session management function (SMF), wherein the SMF determines a target user plane function (UPF)/protocol data unit (PDU) session anchor (PSA), and the target UPF/PSA being configured to reallocate UE target network address information to the UE, and generate a second NAT parameter according to the first NAT parameter, the UE source network address information and the UE target network address information; and return the second NAT parameter to the SMF, and perform NAT translation on a received data packet according to the second NAT parameter;
obtaining the second NAT parameter from the SMF; and
configuring a third NAT parameter for the target AS according to the second NAT parameter, and migrating the data service from the source AS to the target AS, wherein the target AS performs NAT translation on the data packet according to the third NAT parameter.

16. The non-transitory computer-readable storage medium according to claim 15, wherein the determining a data service migration from the source AS to a target AS comprises:
receiving an event exposure early notification message from the SMF; and
determining to migrate the data service from the source AS to the target AS according to the event exposure early notification message.

17. The non-transitory computer-readable storage medium according to claim 15, wherein the determining a data service migration from the source AS to a target AS comprises:
receiving a traffic influence early notification message from a network exposure function (NEF), wherein the NEF being configured to receive an event exposure early notification message from the SMF and transmit the traffic influence early notification message to the AF according to the event exposure early notification message.

18. The non-transitory computer-readable storage medium according to claim 15, wherein the first NAT parameter comprises target AS network address information of the target AS, and the target AS network address information comprises a target AS Internet Protocol (IP) address and a target AS port number, wherein the transmitting a first NAT parameter to an SMF comprises:
transmitting an event exposure application relocation message to the SMF, the event exposure application relocation message carrying the target AS IP address and the target AS port number.

19. The non-transitory computer-readable storage medium according to claim 15, wherein the first NAT parameter comprises target AS network address information of the target AS, and the target AS network address information comprises a target AS IP address and a target AS port number, wherein the transmitting a first NAT parameter to an SMF comprises:
transmitting a traffic influence application relocation information message to an NEF, the traffic influence application relocation information message carrying the target AS IP address and the target AS port number, so that the NEF transmits an event exposure application relocation message to the SMF, the event exposure application relocation message carrying the target AS IP address and the target AS port number.

20. The non-transitory computer-readable storage medium according to claim 15, wherein the first NAT parameter comprises target AS network address information of the target AS, and the target AS network address information comprises a target AS IP address and a target AS port number, wherein the transmitting a first NAT parameter to an SMF comprises:
transmitting a policy authorization create/update request message to a policy control function (PCF), the policy authorization create/update request message carrying the target AS IP address and the target AS port number, so that the PCF transmits a session management policy control update notification message to the SMF, the session management policy control update notification message carrying the target AS IP address and the target AS port number.

\* \* \* \* \*